United States Patent [19]
Hoshino

[11] Patent Number: 5,317,426
[45] Date of Patent: May 31, 1994

[54] COLOR ESTIMATION METHOD FOR EXPANDING A COLOR IMAGE FOR REPRODUCTION IN A DIFFERENT COLOR GAMUT

[75] Inventor: Toru Hoshino, Hino, Japan

[73] Assignee: Konica Corporation, Tokyo, Japan

[21] Appl. No.: 796,251

[22] Filed: Nov. 22, 1991

[30] Foreign Application Priority Data

Nov. 26, 1990 [JP] Japan ................................. 2-321687
Nov. 26, 1990 [JP] Japan ................................. 2-321688

[51] Int. Cl.$^5$ ............................ H04N 1/46; G03F 3/08
[52] U.S. Cl. .................................. 358/515; 358/501; 358/518; 358/519; 358/520
[58] Field of Search ............... 358/78, 80, 500, 501, 358/504, 505, 515, 521, 523, 530, 539, 518, 519, 520

[56] References Cited

U.S. PATENT DOCUMENTS

| | | | |
|---|---|---|---|
| 4,701,790 | 10/1987 | Yamada | 358/515 |
| 4,758,885 | 7/1988 | Sasaki et al. | 358/80 |
| 4,929,978 | 5/1990 | Kanamori et al. | 358/520 |
| 4,959,711 | 7/1990 | Hung et al. | 358/80 |
| 5,089,884 | 2/1992 | Suzuki et al. | 358/80 |
| 5,121,196 | 6/1992 | Hung | 358/80 |

FOREIGN PATENT DOCUMENTS 0178047  4/1986  European Pat. Off. ............ 358/505

*Primary Examiner*—Mark R. Powell
*Assistant Examiner*—Kimberly A. Williams
*Attorney, Agent, or Firm*—Finnegan, Henderson, Farabow, Garrett & Dunner

[57] ABSTRACT

The invention provides a method of transforming a color image data of a first media (color hardcopy) so as to be reproduced by a second media (color CRT), the color reproducing capabiity of which is larger than that of the first media. The chroma of color image data "T" is compared with a threshold value which is "a" (a <1.0) times of the maximum chroma of the first color gamut of the first media at the lightness "LT" and the hue "$\theta T$" of the color image data "T". The chroma "rT" is enlarge in accordance with the comparison result without changing the hue "$\theta T$".

6 Claims, 18 Drawing Sheets

COLOR COMPONENT IMAGE CORRECTING DEVICE

COLOR PATCH BY Y', M', C'

COLOR PATCH BY Y', M', C'

COLOR PATCH BY Y', M', C'

COLOR PATCH BY Y', M', C'

COLOR PATCH BY Y', M', C'

COLOR GAMUT OF PRINTING

COLOR GAMUT OF PRINTING

COLOR GAMUT OF PRINTING

COLOR PATCH BY Y,M,C,K

COLORIMETRIC SYSTEM INDICATING
LIGHTNESS AND CHROMA

| L* | 20 | 25 | ---------------- | 95 | 100 |
| --- | --- | --- | --- | --- | --- |
| u* | 0 | 0 | ---------------- | 0 | 0 |
| v* | 0 | 0 | ---------------- | 0 | 0 |

GRAY WEDGE TARGET PATCHES

TARGET COLOR
ON Y,N COORDINATE SYSTEM

PROVIDING TARGET VALUE T'

COLOR GAMUT OF COLOR CRT

COLOR GAMUT OF COLOR CRT

COLOR GAMUT OF COLOR CRT

EXPLANATION FOR COMPRESSING AND MAPPING

SECTIONAL PLANE OF COLOR GAMUT AT θT"

CHANGE IN CONDITION
OF LINE IN EXAMPLE 2

CHANGE IN CONDITION
OF LINE IN EXAMPLE 1

CHANGE IN CONDITION OF LINE IN EXAMPLE 3

RELATION BETWEEN HUE ANGLE AND u* v* AXES

EXPLANATION FOR
INTERPOLATION PROCESS (CUBIC)

EXPLANATION FOR INTERPOLATION
PROCESS (TRIANGULAR PYRAMID)

TRIANGULAR PYRAMID T AT P (5.1.2)

TRIANGULAR PYRAMID T AT P (3.1.5)

COLOR COMPONENT IMAGE CORRECTING DEVICE

AN EXAMPLE OF ENLARGEMENT OF COLOR REPRODUCTION GAMUT

COLOR REPRODUCTION GAMUT
OF COLOR CRT AND HARDCOPY

COLOR REPRODUCTION GAMUT
OF COLOR CRT AND HARDCOPY

COLOR ESTIMATION METHOD FOR EXPANDING A COLOR IMAGE FOR REPRODUCTION IN A DIFFERENT COLOR GAMUT

The present invention relates to a color estimation method which is suited to a color component image correction device which is used so as to reproduce, for example, a color hard copy as a color CRT.

When a color hard copy is reproduced as a color CRT, the colorimetric systems are different from each other. A color CRT is formed through an additive color mixing in which a phosphor RGB colorimetric systems is used as the color representation system. On the other hand, a color hard copy is formed through a subtractive color mixing in which, for example, a YMC coordinate system, is used as the colorimetric system. In this case, the image data is converted or the colors are corrected by these colorimetric systems.

When a color hard copy is reproduced as a color CRT, for example, yellow (Y), magenta (M), cyan (C) and black (K) image data are supplied to a color component image correcting device 200 as shown in FIG. 26, red (R), green (G), and blue (B) image data (color correction data) are outputted from the color component image collecting device 200, and the color correction data is supplied to a color CRT 100.

It is possible to refer to the lookup table so as to obtain color correction data from Y, M, C, and K image data. As a method for obtaining color correction data to be stored in this lookup table, a method, for example, indicated in Japanese Patent Application Laid-Open No. 1988-254864 is proposed.

Color patches of combinations of Y, M, and C image data are outputted and measured colorimetrically so as to obtain the values of the colorimetric system. Simultaneously, color patches of combinations of R, G, and B image data of color CRT are displayed on the display device and measured colorimetrically so as to obtain the values of the same colorimetric system as that of color hard copy. Using the values of the colorimetric system obtained by measuring the color patches on the color CRT colorimetrically, a combination of R, G, and B image data of a color CRT is obtained by an interpolation operation so as to obtain the same as or close to the value of the colorimetric system obtained by measuring the color patches of combinations of Y, M, and C image data of the color hard copy.

The color reproduction gamut by R, G, and B image data of color CRT is generally wider than the color reproduction gamut by Y, M, and C image data of a color hard copy.

Therefore, when selecting R, G, and B image data which have a corresponding value substantially equal to the values of the Y, M, and C image data on the colorimetric system, R, G, and B image data are limited to a color in a limited narrow region of the color reproduction gamut of R, G, and B image data.

As a result, a low lightness color (high density) and a high chroma color is not reproduced, and a reproduced image lacks contrast, brightness, or vividness.

To eliminate such a defect, it is required to enlarge the color reproduction gamut of Y, M, and C image data so as to match the color reproduction gamut of R, G, and B image data. In this case, a technique to enlarge and map lightness and chroma is very important, because the conversion result greatly depend on the technique.

For example, in the conventional method for moving chroma to a high chroma side with the hue fixed after enlargement operation to match the maximum and minimum of lightness, there are problems imposed such that the movement distance is determined according to the external form of the color gamut, and the hue is always fixed and the chroma is unbalanced during movement.

In FIG. 27, a solid line "a" indicates the color reproduction gamut of color CRT and a solid line "b" indicates the color reproduction gamut of a hard copy. When values C1 and C2 in the color reproduction gamut of the hard copy are moved to values C1' and C2' in the color reproduction gamut of color CRT, the difference in chroma value between C1' and C2' becomes much larger than that between C1 and C2, and these chroma value become unbalanced.

When a color hard copy image of the three primary or primary colors Y, M, and C is reproduced as a color CRT of the three primary colors R, G, and B, the chroma values of the three colors Y, M, and C among the six colors R, G, B, Y, M, and C are apt to be high in the color hard copy, while chroma values of the three colors R, G, and B among the six colors R, G, B, Y, M, and C are apt to be high in the color CRT. As a result, when, for example, the cyan color with a high chroma value of a color hard copy image is moved into the color reproduction gamut of a color CRT with the hue fixed, the amount of increasing the chroma is lowered. There is a problem, like this, that for a color with a high chroma on a color hard copy image, the amount of chroma is lowered and the balance of chroma between the entire colors is changed after movement.

The object of the present invention is to provide a method, for example, for reproducing a color hard copy image as a color CRT image so that the balance of chroma values between the entire colors is not changed and the lightness and chroma are kept satisfactory.

The white of highest lightness of color CRT is generally bluish. The solid line "a" shown in FIG. 28 or 29 indicates the color reproduction gamut of color CRT and the dashed line "b" indicates the color reproduction gamut of hard copy.

Therefore, when a hard copy color image is to be reproduced on the color CRT device, by obtaining R, G, and B image data for Y, M, C, and K image data as described above, the hard copy white is reproduced with a lightness which is slightly lower than the maximum lightness which can be displayed on the color CRT. As a result, the contrast of a reproduced image of color CRT decreases.

The second object of the present invention is to prevent an image with a low contrast when a color image of color hard copy is reproduced as a color CRT.

SUMMARY OF THE INVENTION

In the first invention of the color estimation method of the present invention, the values of the colorimetric system for each combination of a plurality of input color component image information is obtained and the value of the colorimetric system for each combination of a plurality of output color component image information is obtained.

A CIE standard $L^*u^*v^*$ or $L^*a^*b^*$ colorimetric system is used as a colorimetric system.

$L^*$ among the values of the colorimetric system obtained for an optional combination of the input color component image information is converted according to the ratio of the difference between the maximum and minimum values of the lightness of the input side color gamut on the lightness axis which comprise the value of the colorimetric system obtained for each combination of the input color component image information to the difference between the maximum and minimum values of the lightness of the output side color gamut on the lightness axis which comprise the value of the colorimetric system obtained for each combination of the output color component image information.

u* and v* or a* and b* among the values of the colorimetric system obtained for an optional combination of the input color component image information are not corrected when that chroma is smaller than a value which is "a" (a<1.0) times of the maximum chroma value of the input side color gamut on the straight line passing the lightness and chroma at the hue. When the chroma is larger than the abovementioned value which is "a" times of the maximum chroma value of the input side color gamut on the above straight line, u* and v* or a* and b* are converted so that, while the hue is fixed, the chroma is converted according to the ratio of the difference between the maximum chroma value on the above straight line of the input side color gamut and the abovementioned value which is "a" times of the maximum chroma on the above straight line of the input side color gamut to the difference between the maximum chroma value on the above straight line of the output side color gamut and the abovementioned value which is "a" times of the maximum chroma of the input side color gamut.

Furthermore, when the chroma is converted within a predetermined lightness scope, L* is converted according to the conversion amount of chroma.

At least in an area with a high lightness, the above L* value is converted according to the conversion amount of chroma so as to increase the lightness as the chroma increases.

Using the value of the colorimetric system obtained for each combination of a plurality of output color component image information, a combination of the output color component image information, which has the value of the converted colorimetric system, is obtained.

As to the lightness direction, L* among the values of the colorimetric system obtained for each combination of the input color component image information is converted according to the ratio of the lightness range of the input side color gamut on the lightness axis to that of the output side color gamut, and the lightness of the input side color gamut is enlarged and mapped.

As to the chroma direction, no value is corrected at the overlapped center portion between the color reproduction gamut of the input side and that of the output side. In the peripheral area, u* and v* or a* and b* among the values of the colorimetric system obtained for each combination of the input color component image information are converted according to the difference of the chroma range between the two color gamuts and the chroma of the input side color gamut is enlarged and mapped.

A combination of output color component image information can be obtained in correspondence with the enlarged and mapped colorimetric system value. Therefore, the obtained color reproduction by the output color component image information covers the entire output color reproduction gamut naturally and provides a sufficient lightness or chroma range.

Since the chroma is enlarged, for example, in a high lightness area so that the lightness increases as the chroma increases, when u* and v* or a* and b* are converted and the chroma is enlarged and mapped, the increase amount of chroma is suppressed. By doing this, excessive increases in only colors due to an increase of the chroma by enlargement and mapping, for example, in a high lightness area can be prevented.

According to another invention to attain the first object of the invention, u* and v* or a* and b* among the values of the colorimetric system obtained for an optional combination of the input color component image information are not corrected when the chroma is smaller than a value which is "a" (a<1.0) times of the maximum chroma value at the hue and lightness of the input side color gamut. When the chroma is larger than the above mentioned value, u* and v* or a* and b* are converted so that to the area enclosed by the inner color gamut surface which comprises a value which is "a" times of the maximum chroma value at each hue and lightness of the input side color gamut and the outer surface of the input side color gamut which comprises the maximum chroma value at each hue and lightness of the input side color gamut, the entire area enclosed with the above mentioned inner surface of the input side color gamut and the outer surface of the output side color gamut which comprises the maximum chroma value at each hue and lightness of the output side color gamut corresponds continuously.

As a correspondence method, when the hue, which is obtained by an optional combination of the input color component image information is within a predetermined scope of one of the hues at the maximum chroma points of the three primary colors of these six, blue, green, red, yellow, magenta, and cyan of the input side color gamut, the hue is moved toward the hue at the maximum chroma point of the corresponding color of the output side color gamut as the chroma increases.

As another correspondence method in case that three primary colors of input color component information differ from that of output color component information, when the hue, which is obtained by an optional combination of the input color component image information, is within a predetermined scope of one of the hues at the maximum chroma points of the three primary colors of the input side color gamut, the hue is moved toward one of two hues, which are short distance from the above mentioned hue, at the maximum chroma points of the three primary colors of the output side color gamut.

In the above embodiment, when the chroma of the input side color gamut is enlarged and mapped, the hue is moved so that the peak of each color of the input side color gamut moves toward the peak of the corresponding color of the output side color gamut.

By doing this, the color reproduction gamut on the input side is included in the color reproduction gamut on the output side by natural conversion with the entire chroma balance kept, the color reproduction obtained by the output color component image information provides satisfactory lightness and chroma, and the chroma is well balanced as a whole.

Furthermore, when the three primary colors of the input color component image information, for example, Y, M, and C are different from the three primary colors of the output color component image information, for example, R, G, and B and the chroma of the input side color gamut is enlarged and mapped, the hue is moved so that the peaks of the three primary colors of the input side color gamut is moved to the peaks of the three primary colors of the output side color gamut.

By doing this, although the hue is moved, the entire chroma balance is kept.

According to the color estimation method of the present invention for accomplishing the second object, when u* and v* or a* and b* at the maximum lightness point of the input side color gamut on the colorimetric system, which are obtained for each combination of input color component image information, are different from u* and v* or a* and b* at the maximum lightness point of the output side color gamut on the colorimetric system, values which are obtained for each combination of output color component image information, u* and v* or a* and b* which are obtained for an optional combination of the input color component image information at least in a high lightness area are moved in accordance with the movement distance from u* and v* or a* and b* at the maximum lightness point of the input side color gamut to u* and v* or a* and b* at the maximum lightness point of the above output side color gamut.

Using the colorimetric system values obtained for each combination of a plurality of output color component image information, a combination of the output color component image information, which has the values of the converted colorimetric system values, wherein the above values of u* and v* or a* and b* for an optional combination of the input color component image information are moved, or which are obtained by predetermined conversion, is obtained.

By the above method, at least in a high lightness area, the colorimetric system values u* and v* or a* and b* which are obtained for each combination of the input color component image information are moved in accordance with the movement distance from u* and v* or a* and b* at the maximum lightness point of the input side color gamut to u* and v* or a* and b* at the maximum lightness point of the output side color gamut.

It means that u* and v* or a* and b* move so that the maximum lightness point of the input side color gamut approaches the maximum lightness point of the output side color gamut.

Since a combination of the output color component image information is obtained in correspondence with the moved colorimetric system values, in the obtained color reproduction by the output color component image information, the maximum lightness area in the input color reproduction scope can be reproduced by the maximum lightness area in the output color reproduction scope.

When a hard copy color image is reproduced on the color CRT device, for example, the white color of the hard copy is reproduced as the white color with the maximum lightness which can be displayed on the color CRT device.

As a result, the contrast of a reproduced image will not decrease.

DETAILED DESCRIPTION OF THE PREFERRED EMBODIMENTS

Next, an embodiment of the present invention that R, G, and B image data of color CRT corresponding to Y, M, C, and K image data for color printing are obtained will be described with reference to the accompanying drawings.

It is assumed that Y, M, C, K, R, G, and B image data are all 8 bits long and range from 0 to 255.

Figure 1:
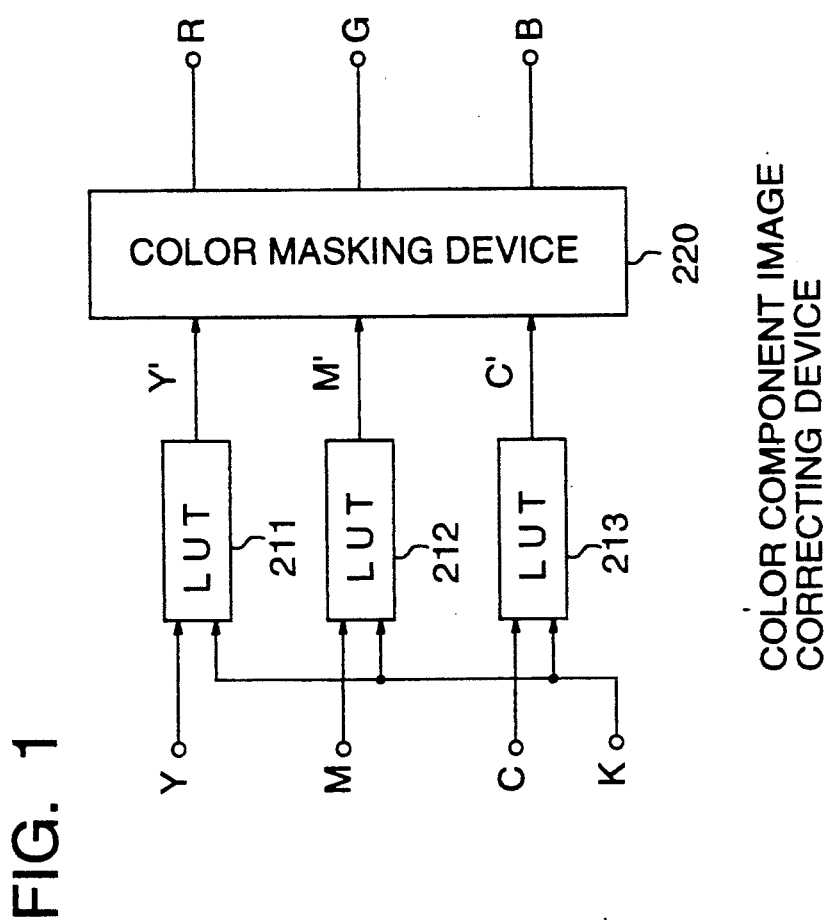
FIG. 1 shows a block diagram for explanation of a color component image correcting device.
Figure 2A:
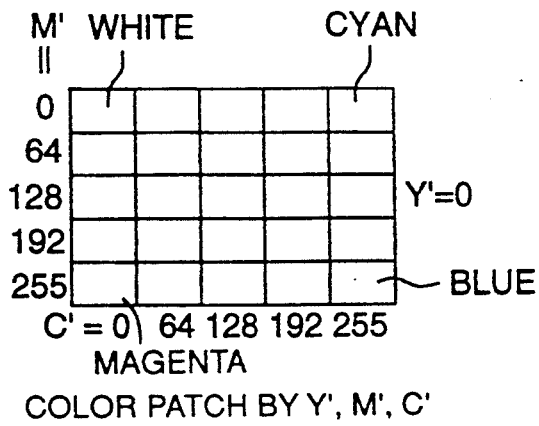
FIG. 2a-2e show illustrations of color patches.
Figure 2B:
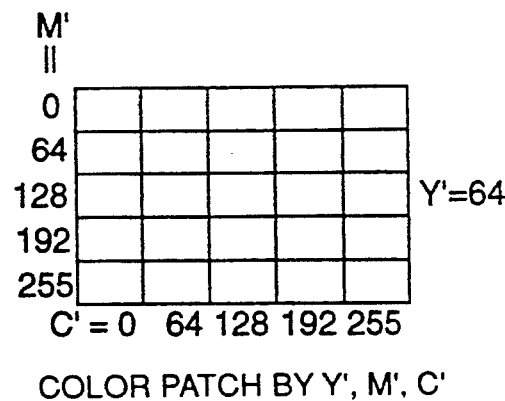
Figure 2C:
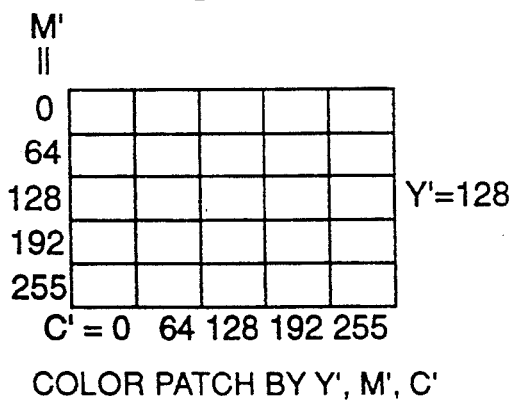
Figure 2D:
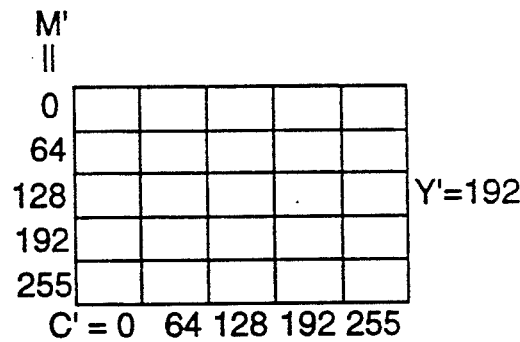
Figure 2E:
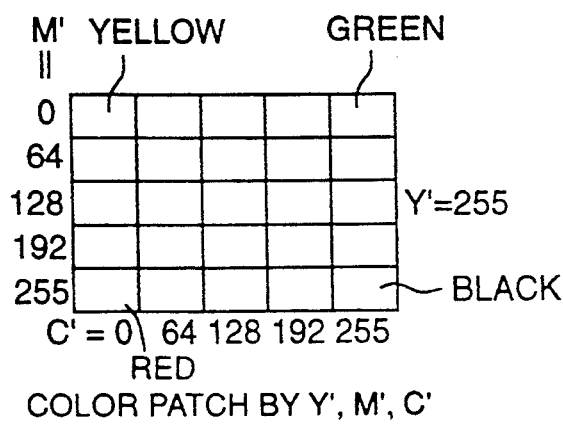

FIG. 1 shows a color component image correction device for obtaining R, G, and B image data corresponding to Y, M, C, and K image data.

In the drawing, yellow (Y), magenta (M), cyan (C), and black (K) image data (printing data) are supplied to lookup tables 211 to 213 constituting a first color conversion means and converted to yellow (Y'), magenta (M'), and cyan (C') image data (compressed printing data).

The compressed printing data Y', M', and C' are supplied to a color masking device 220 and converted to red (R), green (G), and blue (B) image data (color CRT display data).

The compressed printing data Y', M', and C' are stored in the lookup tables 211 to 213 and referred to by printing data Y and K, M and K, and C and K. The Y', M', and C' image data are generated as specified below.

(1) Firstly, color patches of each combination of 8-bit image data Y', M', and C' are measured colorimetrically, the XYZ colorimetric system values are obtained, and furthermore the L*u*v* colorimetric system values are obtained.

In this case, five quantization levels of 0, 64, 128, 192, and 255 are provided for each of the Y', M', and C' image data and patches of colors (5×5×5=125) of combinations of the levels are produced (shown in FIGS. 2a-2e).

The color patches are measured by a spectrophotometer, the XYZ colorimetric system values are obtained as shown below, and furthermore the L*, u*, and v* colorimetric system values are obtained.

$$\begin{cases} X = K \int_{380}^{780} S(\lambda) \bar{x}(\lambda) R(\lambda) d\lambda \\ Y = K \int_{380}^{780} S(\lambda) \bar{y}(\lambda) R(\lambda) d\lambda \\ Z = K \int_{380}^{780} S(\lambda) \bar{z}(\lambda) R(\lambda) d\lambda \end{cases}$$

where: $S(\lambda)$: Spectral distribution of standard illuminant
$\bar{x}(\lambda), \bar{y}(\lambda), \bar{z}(\lambda)$: Color matching functions on the XYZ colorimetric system
$R(\lambda)$: Spectral reflectivity
$K = 100 / \int_{380}^{780} S(\lambda) \bar{y}(\lambda) d\lambda$
$x = X/(X + Y + Z), y = Y/(X + Y +)$ $$\begin{cases} L^* = 116 \, (Y/Yn)^{\frac{1}{3}} - 16 \\ u^* = 13L^* (u' - u'n) \\ v^* = 13L^* (v' - v'n) \end{cases}$$

where: $u' = 4X/(X + 15Y + 3Z)$, $u'n = 4Xn/(Xn + 15Yn + 3Zn)$
$v' = 9Y/(X + 15Y + 3Z)$, $v'n = 9Yn/(Xn + 15Yn + 3Zn)$
$X, Y, Z$: Tristimulus values on the XYZ colorimetric system
$Xn, Yn, Zn$: $X, Y,$ and $Z$ values of perfectly diffusing and prefectly reflecting surface irradiated by standard illuminant.

The intermediate levels of the 5×5×5=125 color data are interpolated and the number of color data is increased to 9×9×9=729. The 729 colors may be printed and measured colorimetrically, though the measurement count is so large and the measurement requires much time.

By doing this, the values of the L*u*v* colorimetric system are obtained for the 9×9×9=729 colors of Y', M', and C' image data.

The values of the L*u*v* colorimetric system are assumed as:

L* IN1(Y', M', C')

u* IN1(Y', M', C')

v* IN1(Y', M', C')

Figure 3A:
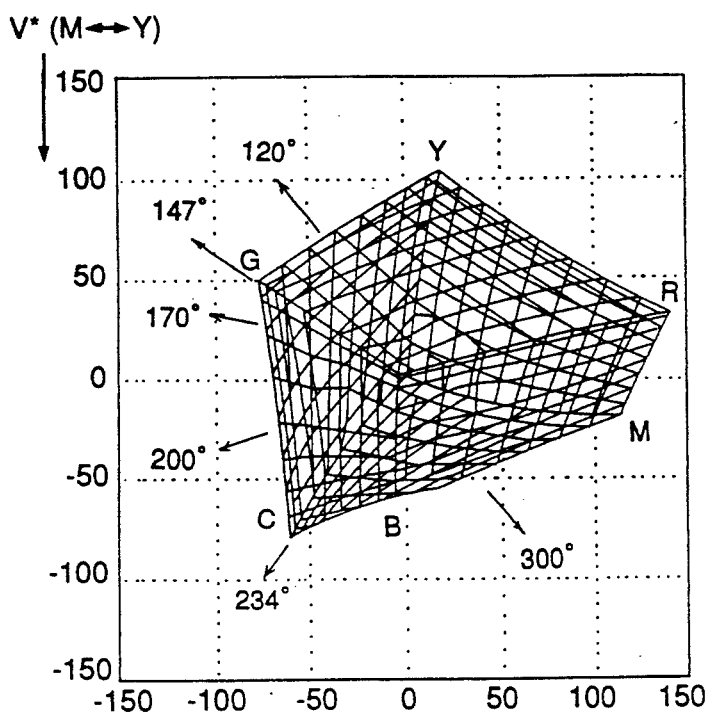
FIG. 3a-3c show a color gamut of printter matter on the CIE standard L*u*v* colorimetric system.
Figure 3B:
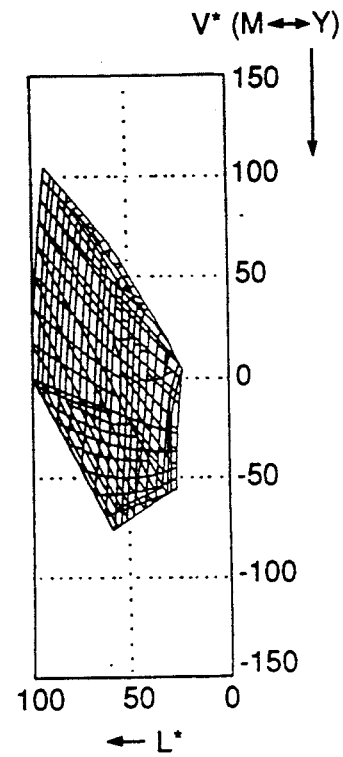
Figure 3C:
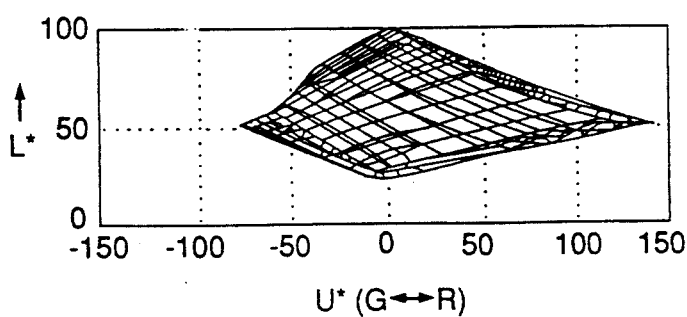

FIGS. 3a-3c shows these values on the L*u*v* colorimetric system. Hereinafter, the colorimetric system is called the printed matter color gamut.

(2) Next, a color patch by each combination of Y, M, C, and K image data is measured colorimetrically, and the values of the XYZ colorimetric system are obtained and then the values of the L*u*v* colorimetric system are obtained.

Figure 4:
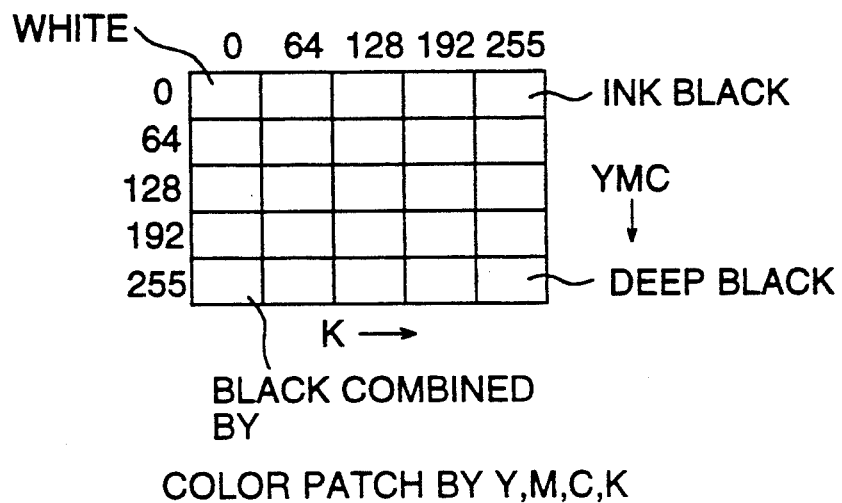
FIG. 4 shows an illustration of color patch.

In this case, five quantization levels of 0, 64, 128, 192, and 255 are provided for Y, M, and C of equivalent weight, and also five quantization levels of 0, 64, 128, 192, and 255 are provided for K image data for each of them so as to produce color patches. This means that 5×5=25 color patches are produced as shown in FIG. 4.

The color patches are colorimetrically measured in the same way as with the processing in (1), the values of the XYZ colorimetric system are determined, and then the values of the L*u*v* colorimetric system are obtained.

(3) Next, so as to allow the color gamut of combinations of Y', M', and C' to contain all the values of the L*u*v* colorimetric system which are obtained in (2), the L* value of the color gamut of Y', M', and C' are proportionally extended to the low L* value side so that the minimum L* value of Y', M' and C' is made smaller than that obtained in (2), and combinations of Y', M', and C' image data corresponding to the values of the L*u*v* colorimetric system which are obtained in (2) are calculated.

The L*u*v* colorimetric system value obtained in correspondence with the color (5×5=25) of each combination of Y, M, C, and K is provided as a target value T', the combinations of Y', M', and C' image data are obtained by the convergence operation.

For simplicity, two basic colors (for example, Y' and M') are used for description.

Figure 5:
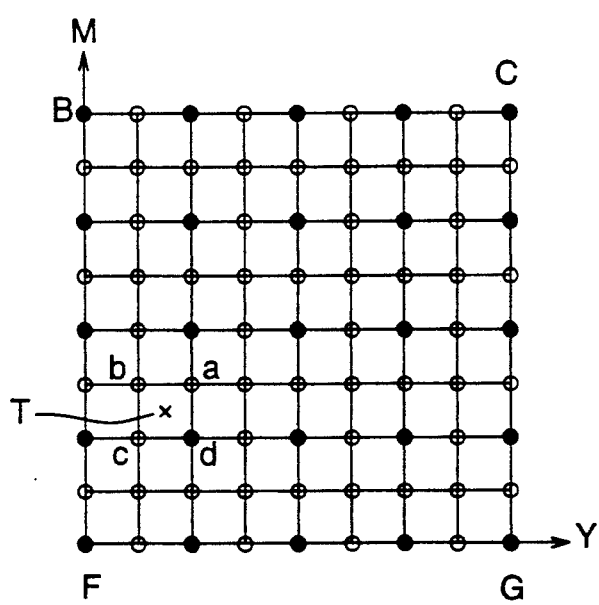
FIG. 5 shows a target color on the Y-M coordinate system.
Figure 6:
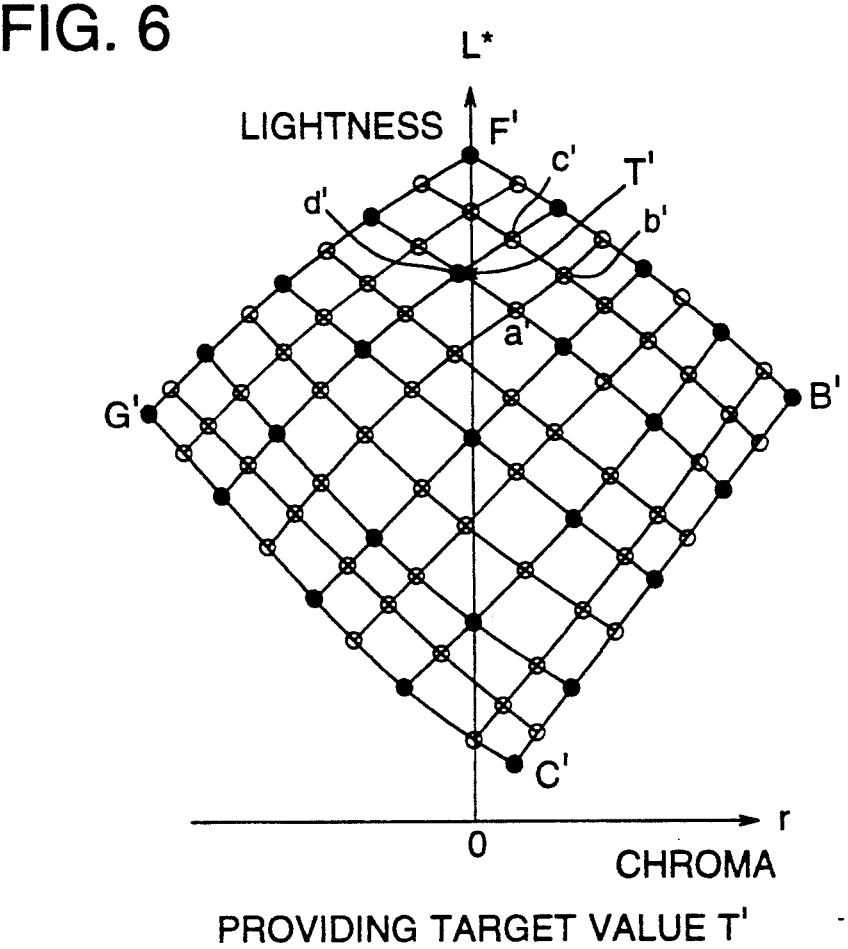
FIG. 6 is the L*u*v* colorimetric system converted from the Y-M coordinate system in FIG. 5.

FIG. 5 shows the Y-M coordinate system. When each lattice point is mapped on the L*u*v* colorimetric system by the processing described in (1), FIG. 6 is obtained. The apexes B, C, G, and F of the square shown in FIG. 5 correspond to B', C', G', and F' shown in FIG. 6.

Figure 7:
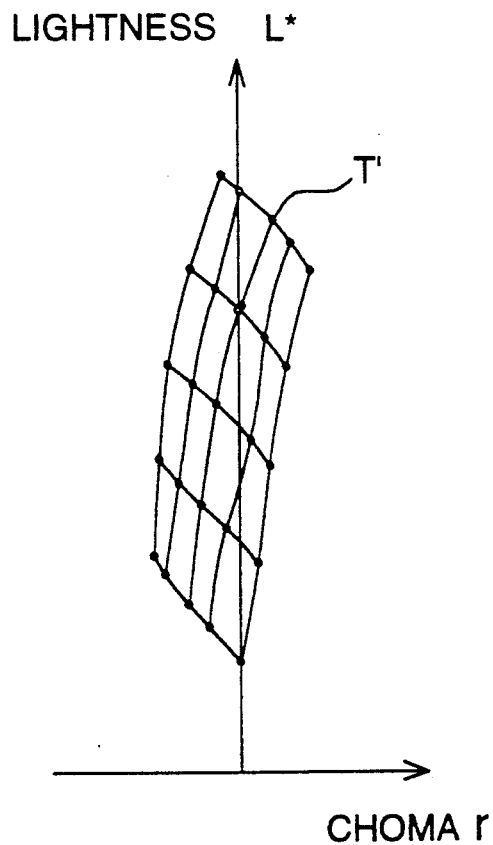
FIG. 7 shows values of the color (5×5=25) of each combination of Y-M-C and K on L*u*v* colorimetric system.

FIG. 7 shows values of the color (5×5=25) of each combination of Y-M-C and K on L*u*v* colorimetric system.

Firstly, s value of the color gamut on the L*u*v* colorimetric system, obtained by target patches of the combinations of Y and M is given as a target value T' (see FIG. 6 and 7). When the target value T' is in the area enclosed by the lattice points a', b', c', and d' as shown in FIG. 6, it is inferred that the combination (target value T) of Y' and M' in the Y' and M' coordinate system is in the area enclosed by the lattice points a, b, c, and d as shown in FIG. 5.

The location of the target value T in the area formed by the lattice points a, b, c, and d is obtained by the convergence operation by mapping the colorimetric system shown in FIG. 6 onto the coordinate system shown in FIG. 5. The reason for performing the convergence operation is that the conversion from the coordinate system shown in FIG. 5 to the colorimetric system shown in FIG. 6 is well known, though the reverse conversion is complicated and a satisfactory conversion expression is not known.

Figure 9:
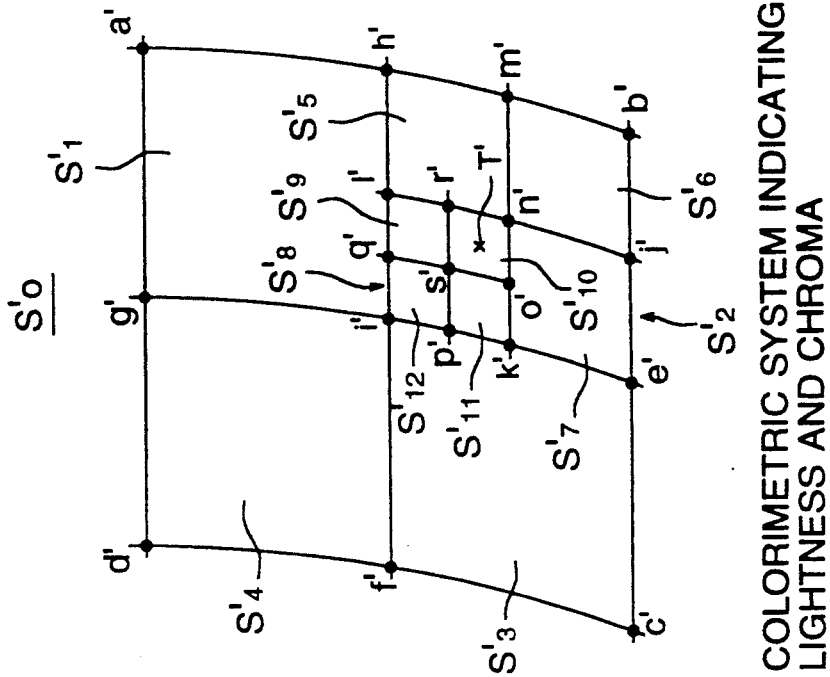
FIG. 9 is the L*u*v* colorimetric system converted from the Y-M coordinate system in FIG. 6.
Figure 8:
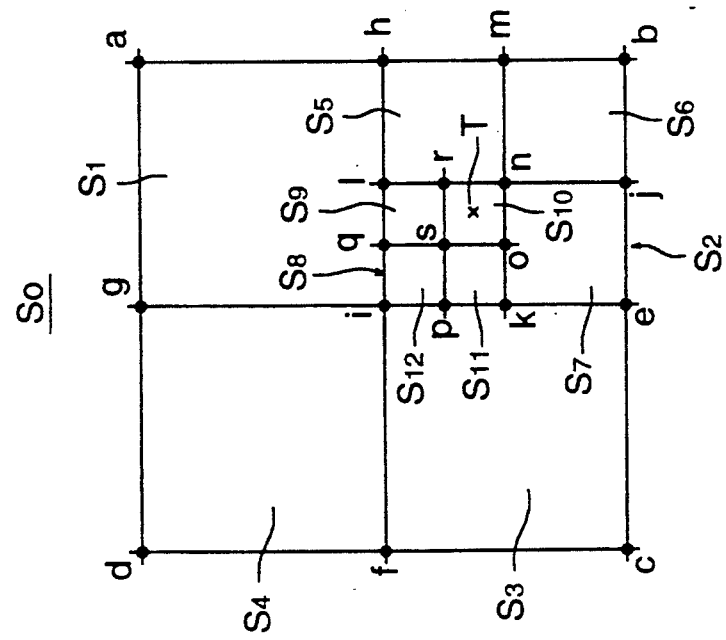
FIG. 8 shows the Y-M coordinate system.

Firstly, the area where the target value T' is located is obtained among a plurality of areas formed by 81 lattice points (see FIG. 6). When the target value T' is in the area S0' as shown in FIG. 9, it is inferred that the target value T is in the area S0 which corresponds to the area S0' as shown in FIG. 8.

Next, the inferred area S0 is equally divided into 4 areas S1, S2, S3, and S4. Five division points e to i are calculated by weight average using the peripheral lattice points which are already obtained. The values corresponding to the division points e to i are converted to those in the L*u*v* colorimetric system, the converted values are plotted on the colorimetric system shown in FIG. 9, and the area among the four areas S1', S2', S3', and S4' formed by the plotted division points e' to i', where the target value T' exists, is obtained. When the target value T' is in the area S2' as shown in FIG. 9, it is inferred that the target value T is in the area S2 corresponding to the area S2' as shown in FIG. 8.

Next, the inferred area S2 is equally divided into 4 areas S5, S6, S7, and S8. Five division points j to n are calculated by weight average using the peripheral lattice points, which are already obtained, and the division points. The values corresponding to the division points j to n are converted to those in the L*u*v* colorimetric system, the converted values are plotted on the colorimetric system shown in FIG. 9, and the area among the four areas S5', S6', S7', and S8' formed by the plotted division points j' to n', where the target value T' exists, is obtained. When the target value T' is in the area S8' as shown in FIG. 9, it is inferred that the target value T is in the area S8 corresponding to the area S8' as shown in FIG. 8.

Next, the inferred area S8 is equally divided into 4 areas S9, S10, S11, and S12. Five division points o to s are calculated by weight average using the peripheral lattice points, which are already obtained, and the division points. The values corresponding to the division points o to s are converted to those on the L*u*v* colorimetric system, the converted values are plotted on the colorimetric system shown in FIG. 9, and the area among the four areas S9', S10', S11', and S12' formed by the plotted division points o' to s', where the target value T' exists, is obtained. When the target value T' is in the area S10' as shown in FIG. 9, it is inferred that the target value T is in the area S10 corresponding to the area S10' as shown in FIG. 8.

As the areas are divided repeatedly like this, the lattice becomes small gradually and is converged finally. By averaging the four lattice points forming the converged area or the division points, the target value T can be obtained.

Using the Y', M', and C' values for the combination of Y, M, and C of equivalent weight and K, which are obtained as described above, Y, M, C, and K are converted to Y', M', and C' by obtaining Y' from Y and K, M' from M and K, and C' from C and K.

(4) As described above, Y', M', and C' image data for each combination of the quantization levels of 0, 64, 128, 192, and 255 of Y, M, C, and K are obtained. Y', M', and C' image data corresponding to the other quantization levels are interpolated.

Figure 10:
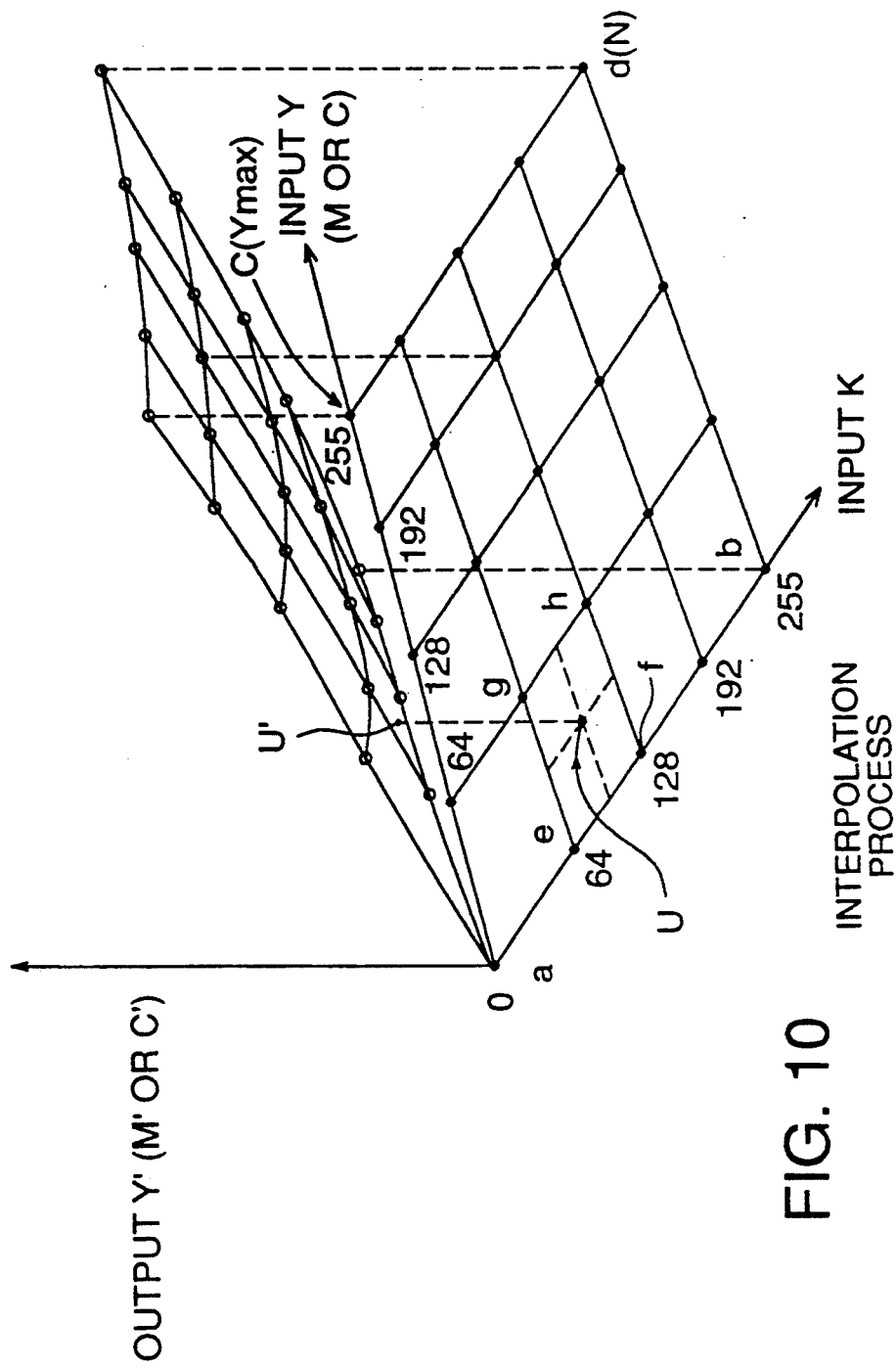
FIG. 10 shows interpolation process from the data of input (Y, K)

The interpolation process is performed according to the data of the four lattice points including the point to be interpolated. For the interpolation process, when an input (Y, K) is provided as shown in FIG. 10, the weighted mean of the four lattice points which enclose the input point is calculated. In the case of the point U, for example, the output at each of the lattice points e, f, g, and h is multiplied by the weighting factor so as to obtain the point U'.

The above interpolation processing is performed at the points of the quantization levels of 0 to 255 excluding the lattice points, and Y' image data corresponding to all the input (Y, K) points is calculated.

M' and C' image data corresponding to all the input (M, K) and (C, K) points are calculated in the same way.

The Y', M', and C' image data, which are obtained by the process in (1) to (4), are stored in the lookup tables 211, 212, and 213, and referred to by (Y, K), (M, K), and (C, K).

In the color masking device 220 shown in FIG. 1, a lookup table for obtaining image data R, G, and B from compressed print data Y', M', and C' may be provided. The image data R, G, and B are stored in this lookup table, and the image data R, G, and B are referred to by the compressed print data Y', M', and C'.

The R, G, and B image data are produced by the method indicated below.

(5) Color patches of each combination of R, G, and B image data are displayed on the color CRT and measured colorimetrically, and the XYZ colorimetric system values are obtained, and furthermore the L*u*v* colorimetric system values are obtained. In this case, five quantization levels of 0, 64, 128, 192, and 255 are provided for each of R, G, and B image data, the colors of combinations of the levels (5×5×5=125) are displayed one by one on the color CRT device, each color is colorimetrically measured by a spectral radiometer, and the XYZ colorimetric system values are obtained and furthermore the L*u*v* colorimetric system values are obtained as shown below.

$$\begin{cases} X = k \int_{380}^{780} S(\lambda) \overline{x}(\lambda) R(\lambda) d\lambda \\ Y = k \int_{380}^{780} S(\lambda) \overline{y}(\lambda) R(\lambda) d\lambda \\ Z = k \int_{380}^{780} S(\lambda) \overline{z}(\lambda) R(\lambda) d\lambda \end{cases}$$

where: $S(\lambda)$: Light source spectral radiation
$\overline{x}(\lambda), \overline{y}(\lambda), \overline{z}(\lambda)$: Color matching functions on the XYZ colorimetric system
$k$: 683 $lm \cdot W^{-1}$ $$\begin{cases} L^* = 116 \ (Y/Yn)^{\frac{1}{3}} - 16 \\ u^* = 13L^* (u' - u'n) \\ v^* = 13L^* (v' - v'n) \end{cases}$$

where: $u' = 4X/(X + 15Y + 3Z)$, $u'n = 4Xn/(Xn + 15Yn + 3Zn)$
$v' = 9Y/(X + 15Y + 3Z)$, $v'n = 9Yn/(Xn + 15Yn + 3Zn)$
$X, Y, Z$: Tristimulus values on XYZ colorimetric system Xn, Yn, Zn: X, Y, and Z values are x, y of standard illuminant $D_{65}$.

$x = X/(X+Y+Z)$, $y = Y/(X+Y+Z)$

The values of x and y of D65 are x=0.3127 and y=0.3290. Therefore, Xn, Yn, and Zn satisfy the following expressions.

$Xn/(Xn+Yn+Zn) = 0.3127$ $Yn/(Xn+Yn+Zn) = 0.3290$

It is necessary to determine the levels of the absolute values of Xn, Yn, and Zn. To match the levels with the levels of the measured values of X, Y, and Z, the value of Yn is made nearly equal to the value of Y among X, Y, and Z when white (R=G=B=255) is displayed.

The intermediate levels of the 5×5×5=125 color data are interpolated and the number of color data is increased to 9×9×9=729. The 729 colors may be displayed and measured colorimetrically, though the measurement count is so large and the measurement requires much time.

By doing this, the values of the L*u*v* colorimetric system can be obtained for the 9×9×9=729 colors of R, G, and B image data. The L*u*v* colorimetric system values are assumed as follows:

L* TV1(R, G, B)

u* TV1(R, G, B)

v* TV1(R, G, B)

Figure 11A:
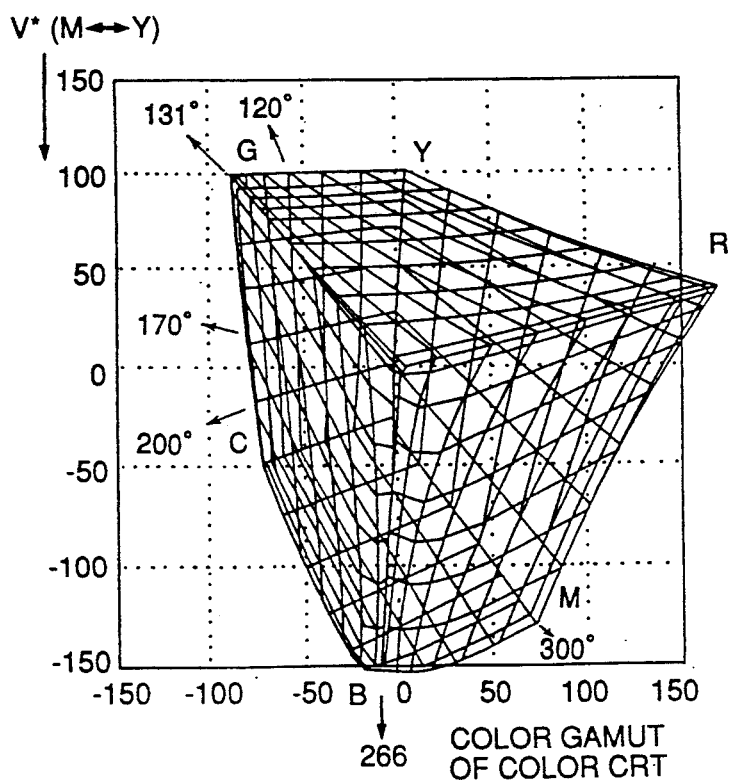
FIG. 11a-11c show a color gamut of the color CRT on the CIE standard L*u*v* colorimetric system.
Figure 11B:
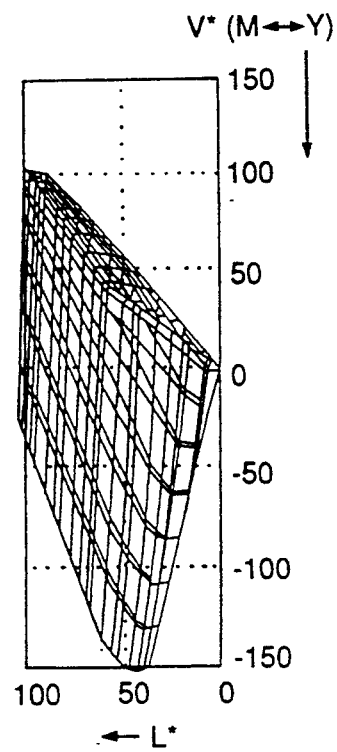
Figure 11C:
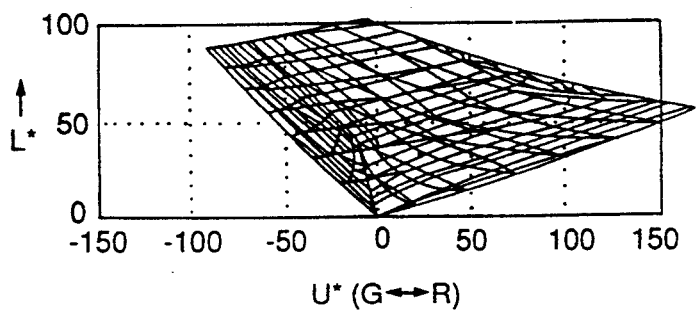

FIGS. 11a-11c show the values on the L*u*v* colorimetric system. Hereinafter, the colorimetric system is called the color CRT color gamut.

(6) Next, the maximum and minimum values of L* are obtained from the printed matter color gamut values.

In this case, a combination wherein the value of L* is maximum among the 9×9×9=729 colors and a combination wherein the value of L* is minimum are obtained and the value of L* at that time is obtained.

Maximum value

The value of L* of white background of paper stork under the condition of Y'=M'=C'=0 is assumed as L* IN1max.

Minimum value

The value of L* when black is printed under the condition of Y'=M'=C'=255 is assumed as L* IN1min.

(7) Next, the maximum and minimum values of L* are obtained from the color CRT color gamut values.

In this case, a combination wherein the value of L* is maximum among the 9×9×9=729 colors and a combination wherein the value of L* is minimum are obtained and the value of L* at that time is obtained.

Maximum value

The value of L* when white is displayed under the condition of R=G=B=225 (color CRT) is assumed as L* TVmax.

Minimum value

The value of L* when black is displayed under the condition of R=G=B=0 is assumed as L* TVmin.

(8) Next, the color CRT color gamut values L* IN1, u* IN1, and v* IN1 are converted to L* IN2, u* IN2, and v* IN2.

L* is converted linearly by the following expression so that the maximum and minimum values of L* of the printed matter color gamut are equal to the maximum and minimum values of L* of the color CRT color gamut.

$$L^* IN2 = \left( \frac{L^* TVmax - L^* TVmin}{L^* IN1max - L^* IN1min} \right) \times (L^* IN1 - L^* IN1min) + L^* TVmin$$

u* and v* are converted by the following expressions in the same way.

$$u^* IN2 = \frac{L^* IN2}{L^* IN1} u^* IN1$$

$$v^* IN2 = \frac{L^* IN2}{L^* IN1} v^* IN1$$

(9) Next, a gray wedge target wherein the values of L* are at even intervals is displayed on color CRT.

Figure 12:
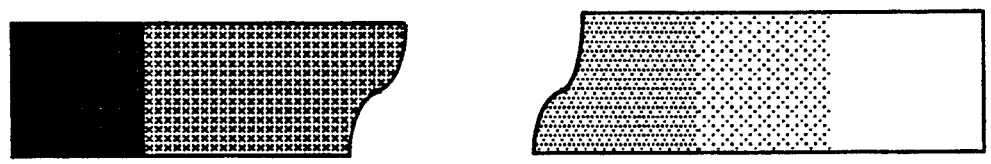
FIG. 12 shows a gray wedge target patches.

A gray wedge target wherein u* and v* are 0 and L* ranges from 20 to 100 at intervals of five quantization levels is displayed (see FIG. 12).

In this case, using the values of L* TV(R, G, B), u* TV(R, G, B), and v* TV(R, G, B) as the data of color gamut, the values of R, G, and B at each step of the gray wedge target are obtained by the convergence operation.

The explanation of the convergence operation is omitted, because it has been already explained by using FIGS. 5 to 9.

The gray wedge target is displayed on the color CRT from the image data of R, G, and B at each step, which are obtained as described above.

(10) Next, a wedge target chart wherein the values of L* are at even intervals is produced on a printed matter.

A gray wedge target wherein u* and v* are 0 and L* ranges from 20 to 100 at intervals of five quantization levels is produced (see FIG. 12).

In this case, using L* IN2(X', M', C'), u* IN2(Y', M', C'), and v* IN2(Y', M', C') of the printed matter color gamut data, the values of R, G, and B at each step of the gray wedge target are obtained by the convergence operation.

A gray wedge target is produced by a printing process from the image data of Y', M', and C' at each step, which are obtained as described above.

(11) Next, the gray wedge target on the printed matter is compared with the gray wedge target of the color CRT device, and whether the condition of discrimination on the boundary at each step of the target on the printed matter is the same as that of the target of the color CRT device is checked. When they are not the same, the values of the L*u*v* colorimetric system of the color gamut on the printed matter are converted as follows:

$$L^* IN3 = \left( \frac{L^* IN2 - L^* IN2min}{L^* IN2max - L^* IN2min} \right)^\gamma \times (L^* IN2max - L^* IN2min) + L^* IN2min$$

$$u^* IN3 = \frac{L^* IN3}{L^* IN2} u^* IN2$$

$$v^* IN3 = \frac{L^* IN3}{L^* IN2} v^* IN2$$

The value of the constant r is changed, L* IN3, u* IN3, and v* IN3 are recalculated, the operation in (10) is performed by using L* IN3, u* IN3, and v* IN3 instead of L* IN2, u* IN2, and v* IN2, and the target on the printed matter is compared with the chart of the color CRT device once again.

The operations in (10) and (11) are repeated, and L* IN3, u* IN3, and v* IN3 are used in the following operation. (12) Next, a combination of R, G, and B (color correction data) for each combination of Y', M', and C' is obtained.

The values L* IN3, u* IN3, and v* IN3 of the L*u*v* colorimetric system for the color (32×32×32=32768) of each combination of Y', M', and C' are obtained. The values are given to the color gamut of the color CRT device (shown in FIGS. 11a-11c as a target value T', and the values of R, G, and B for each combination of Y', M', and C' are obtained by the convergence operation.

The color reproduction gamut of the color CRT device is wider around high lightness portion than the color reproduction gamut on the printed matter. On the other hand, around a part of low lightness portion, the scope of the printed matter is wider (shown in FIG. 13). The target value T' may be outside the color reproduction gamut of the color CRT device on this stage. In this case, the target value T' is converted to a value within the color reproduction scope of the color CRT device by the following methods.

Figure 13:
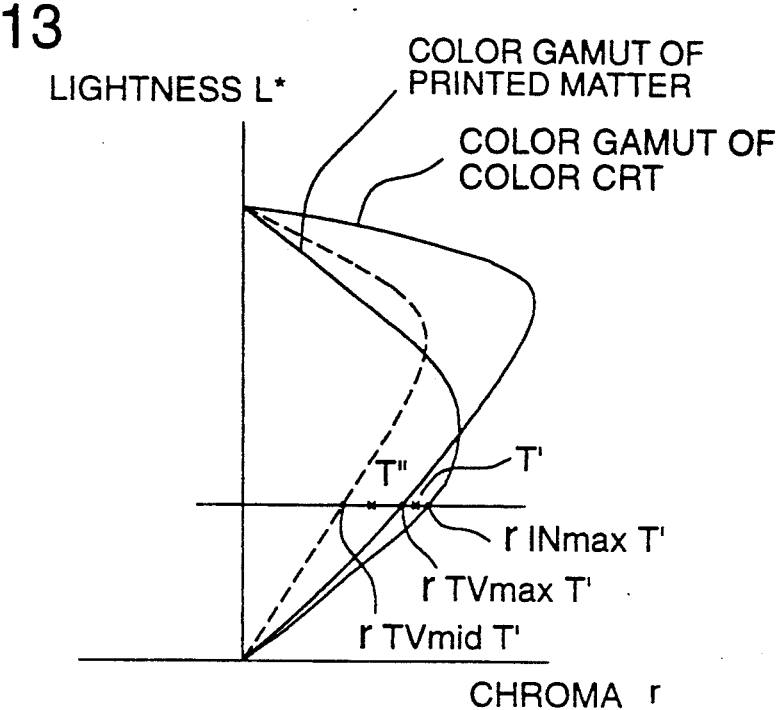
FIG. 13 to 19 are illustrations for the color estimation method of the present invention.

Namely, the values $L^*$ IN3, $u^*$ IN3, and $v^*$ IN3, which are obtained for each combination of Y', M', and C', are given to the color CRT device color gamut (shown in FIGS. 11a-11c ) as a target value T'. The values of $L^*u^*v^*$, and $v^*$ at this time are assumed as $L^*$ T', $u^*$ T', and $v^*$ T'. Assuming that the chroma value obtained by $$\sqrt{u^*T'^2 + v^*T'^2}$$

is rT' and the hue angle obtained by arctan ($v^*$ T' / $u^*$ T') is $\theta$T', the chroma value r TVmidT' which is "a" (a<1.0) times, for example, about ⅔ times, of the maximum chroma value r TVmaxT' of the color gamut of the color CRT device for $L^*$ IN3 and $\theta$T' is taken as a threshold value (see FIG. 13).

When rT" is smaller than r TVmidT', no correction is performed, and it is assumed that $L^*$ T"=$L^*$ T', $u^*$ T"=$u^*$ T', $v^*$ T"=$v^*$ T', rT"=rT', and $\theta$T41 =$\theta$T'.

When rT' is larger than r TVmidT', it is assumed that $L^*$ T"=$L^*$ T' and $\theta$T"=$\theta$T' and rT" is expressed as follows:

$$rT'' = \frac{(r\ TVmaxT - r\ TVmidT)}{(r\ INmaxT - r\ TVmidT)} \times$$

$$(rT - r\ TVmidT) + r\ TVmidT$$

In this expression, r INmaxT' is the maximum chroma value of the color gamut on the printed matter for $L^*$ T' and $\theta$T' (see FIG. 13).

$u^*$ T" and $v^*$ T" are so determined that $\theta$T"=$\theta$T' and that rT" satisfies the above expression.

As described above, $L^*$ T", $u^*$ T", and $v^*$ T" (target value T") which are converted from $L^*$ T', $u^*$ T', and $v^*$ T' (target value T') are within the color reproduction gamut of the color CRT device.

$L^*$ T", $U^*$ T" and $V^*$ T" (target value T") which are obtained by the above method, are further operated to move to outside within the color reproduction gamut of the color CRT by one method of [Example 1] to [Example 5], which will be explained hereinafter.

The maximum chroma value is obtained as specified below.

Values wherein only values of combinations for the outer surface of the color gamut are converted to lightness $L^*$, chroma r, and hue $\theta$ are used. There are 8 surfaces which constitute the outer surface of the color gamut, where the values of Y', M', and C' or R, G, and B are all 0 or maximum. The lattice point containing the hue $\theta$ and lightness $L^*$ is searched for, and the maximum chroma value is obtained from the chroma values at 4 peripheral points by weight average.

Example 1

Assuming that, at $L^*$T" and $\theta$T", the maximum chroma value of the printed matter color gamut (input side) is r INmaxT" and the maximum chroma value of the color CRT device color gamut (output side) is r TVmaxT", when r INmaxT" is not larger than r TVmaxT", r AmaxT"=r INmaxT", and when r ImaxT" is larger than r TVmaxT", r AmaxT"=r TvmaxT".

Figure 14:
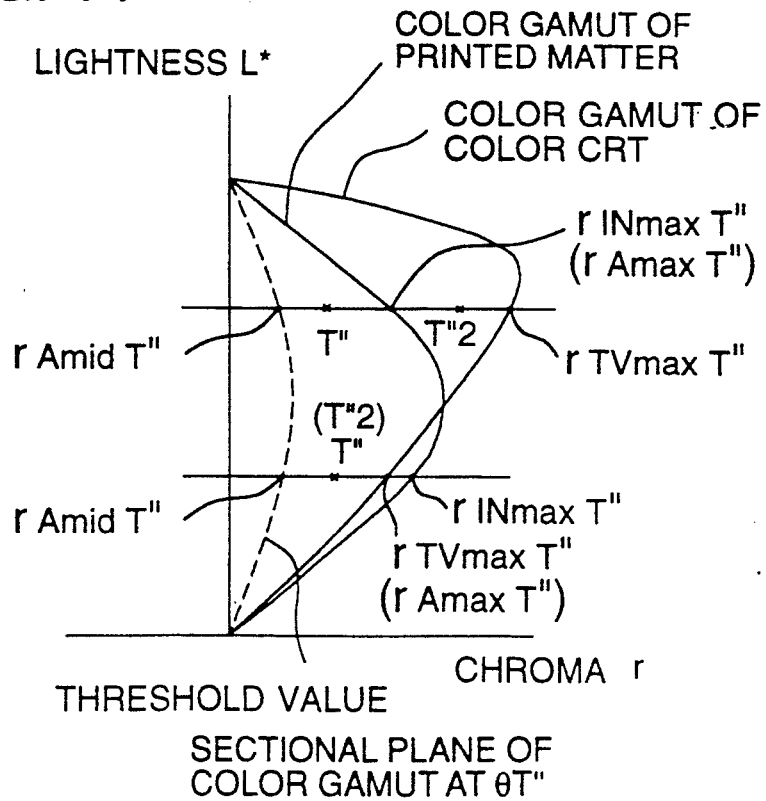

The chroma value r AmidT" which is "a" (a<1.0) times, for example, about ⅓ times, of r AmaxT" is used as a threshold value (see FIG. 14).

When rT" is smaller than r AmidT", no correction is performed, and it is assumed that $L^*$ T"2=$L^*$ T", $u^*$ T"2=$u^*$ T", $v^*$ T"2=$v^*$ T", rT"2=rT", and $\theta$T"2=$\theta$T". When rT" is larger than r AmidT", it is assumed that $L^*$ T"2=$L^*$ T" and OT"2=$\theta$T" and rT"2 is expressed as follows:

$$rT''2 = \frac{(r\ TVmaxT'' - r\ AmidT'')}{(r\ AmaxT'' - r\ AmidT'')} \times$$

$$(rT' - r\ AmidT'') + r\ AmidT''$$

$u^*$ T"2 and $v^*$ T"2 are values when $\theta$T"2=$\theta$T" and rT"2 satisfies the above expression.

$L^*$ T"2, $u^*$ T"2, and $v^*$ T"2 (target value T"2) are obtained by the above method, and chroma is increased within the color reproduction gamut of the color CRT.

Example 2

Figure 15:
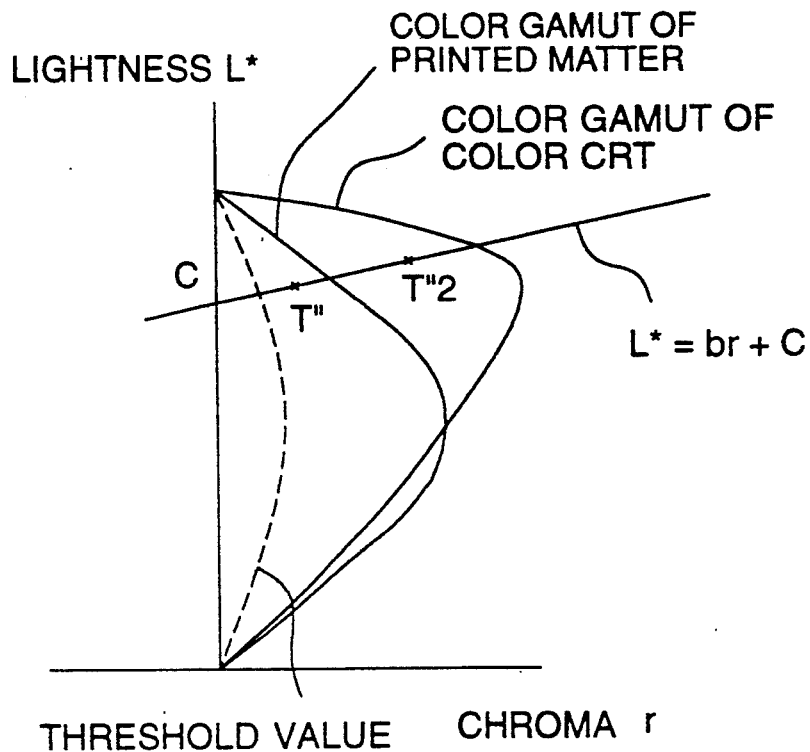

In this example, a straight line passing $L^*$T" and rT" on a section of the color gamut at a hue angle of $\theta$T" is considered (see FIG. 15). The straight line is expressed as shown below. In this expression, a symbol r indicates a chroma.

$$L^* = b \times r + c \quad (1)$$

By the movement distance which is obtained from the maximum chroma value of the color gamut of the printed matter and the maximum chroma value of the color CRT color gamut on the straight line, the target value moves outward on the straight line.

The meaning of the above straight line is that since the target value moves on the straight line, the rate at which the lightness is decreased or increased so as to increase the chroma is determined.

Expression 1 is determined as follows depending on the value of $L^*$ T":

When $L^*$ T"$\leq$70:

$b=0$ $c=L^*T''$

Hence:

$$L^* = b \times r + c \quad (1a)$$
$$= L^*T'$$

When $L^*$ T">70:

$b=(L^*0-70)/30\times0.15$ $$c = L^*0$$

Hence:

$$L^* = b \times r + c \quad \text{(1b)}$$
$$= (L^*0 - 70)/(30 \times 0.15) \times r + L^*0$$

L* 0 indicates a value of L* when r=0 and is obtained, for example, as shown below by using L* T″ and rT″ for L* and r in Expression 1b:

$$L^*0 = \frac{L^*T'' + 0.15 \times 70 \times rT''/30}{1 + 0.15 \times rT''/30}$$

Figure 17:
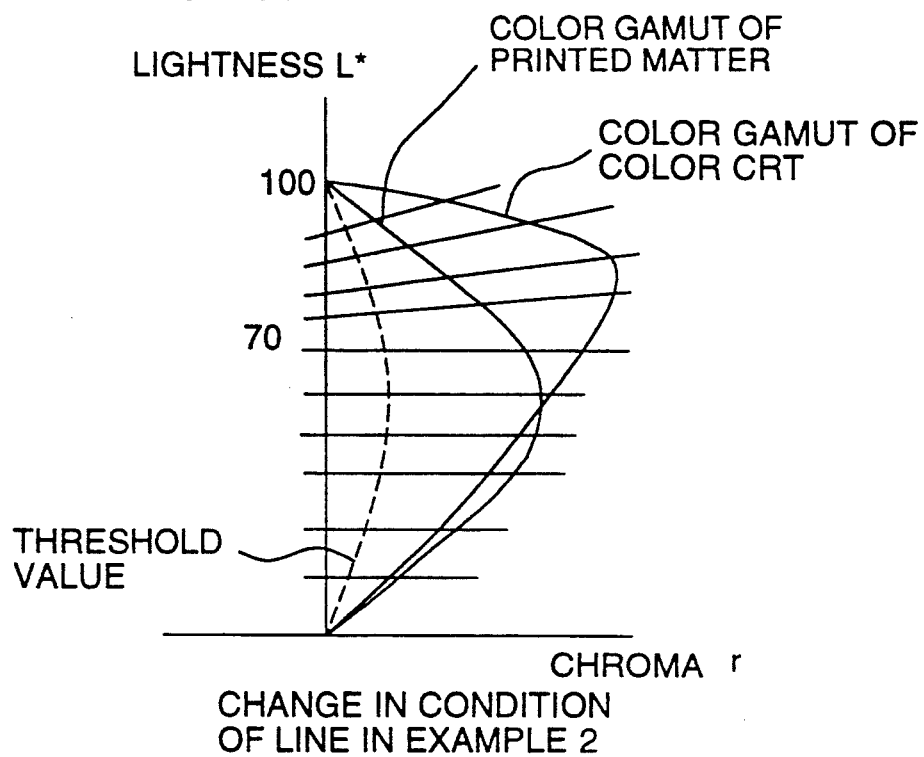

FIG. 17 shows status changes of the straight line which is determined as described above.

Next, assuming that, on the straight line obtained on the target value T″, the maximum saturation of the printed matter color gamut (input side) is r INmaxT″ and the maximum chroma of the color CRT color gamut (output side) is r TVmaxT″, when r INmaxT″ is not larger than r TVmaxT″, r AmaxT″=r INmaxT″, and when r INmaxT″ is larger than r TVmaxT″, R AmaxT″=r TvmaxT″.

Figure 16:
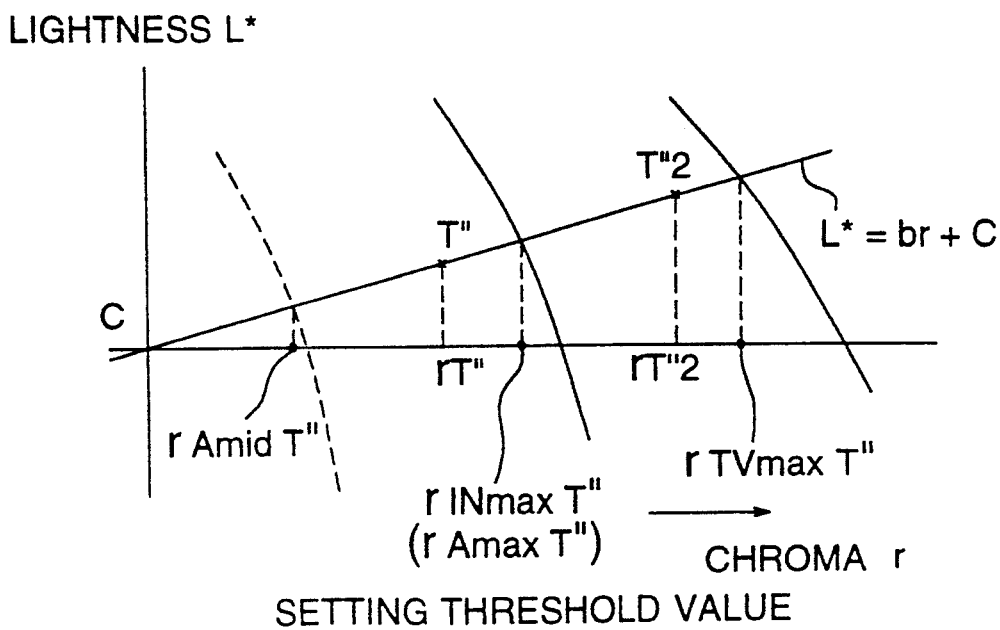

As shown in FIG. 16, the chroma value r AmidT″ which is "a" times (a<1.0), for example, about ⅓ times of the maximum chroma value r AmaxT″ is assumed as a threshold value.

When rT″ is not larger than r AmidT″, no correction is performed, and it is assumed that L* T″2=L* T″, u* T″2 =u* T″, v* T″2=v* T″, rT″2=rT″, and θT″2=θT″.

When rT″ is larger than r AmidT″, it is assumed that L* T″2=L* T″, θT″2=θT″, and rT″ is obtained as follows:

$$rT''2 = \frac{(r\,TVmaxT'' - r\,AmidT'')}{(r\,AmaxT'' - r\,AmidT'')} \times$$

$$(rT'' - r\,AmidT'') + r\,AmidT''$$

It is assumed that the hue angle is fixed and θT″2=θT″. u* T″2 and v* T″2 are values when θT″2=θT″ and rT″ satisfies the above expression.

Furthermore, since the variation of lightness when the chroma value moves from rT″ to rT″2 on the straight line is b (rT″−rT″2), it is assumed that:

$$L^*T''2 = L^*T'' - b\,(rT''-rT''2)$$

In this case, when L* T″≦70, b=0 and the lightness does not change. When L* T″>70, b>0 and the lightness increased.

L* T″2, u* T″2, and v* T″2 (target value T″2) are obtained by the above method, and that chroma is increased within the color reproduction gamut of the color CRT device.

Figure 18:
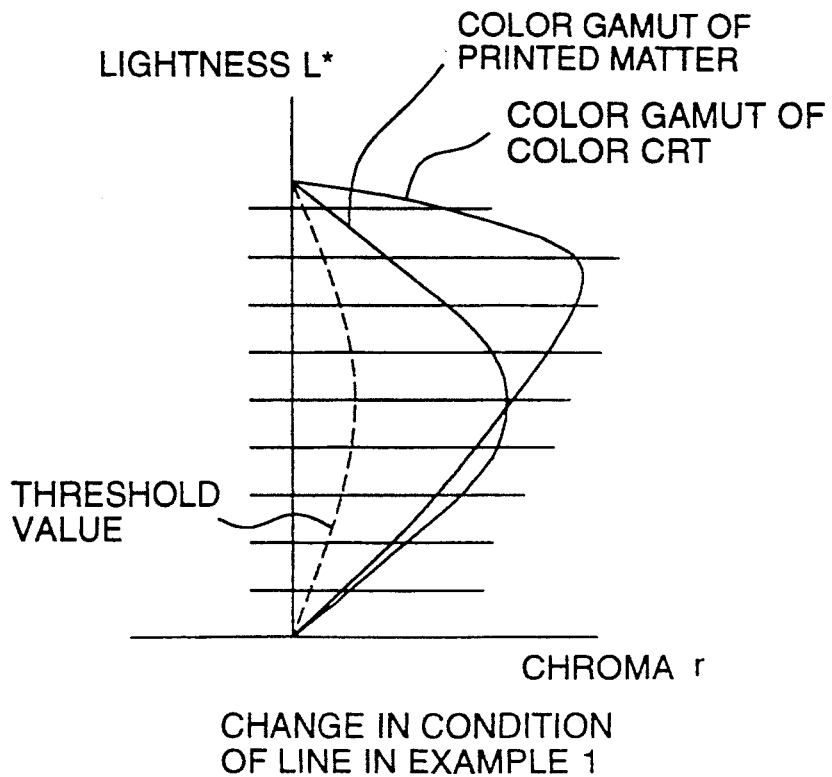

Example 1 is equivalent to Example 2 wherein L* of the expression of the straight line, Expression 1, is fixed to L* T″. FIG. 18 shows status changes of the straight line in Example 1.

Example 3

Also in this example, the straight line expressed by Expression (1) is assumed in the same way as with Example 2. In this example, Expression (1) is determined as shown below depending on the value of L* T″:
When L* T″<50:

$$b = (50 - L^*0)/30 \times (-0.15)$$

$$c = L^*0$$

Hence:

$$L^* = b \times r + c \quad \text{(1a)}$$
$$= (50 - L^*0)/30 \times (-0.15) \times r + L^*0$$

When 50≦L* T″≦70:

$$b = 0$$

$$c = L^*T''$$

Hence:

$$L^* = L^*T'' \cdots \quad \text{(1b)}$$

When L* T″>70:

$$b = (L^*0 - 70)/30 \times 0.15$$

$$c = L^*0$$

Hence:

$$L^* = b \times r + c \quad \text{(1c)}$$
$$= (L^*0 - 70)/30 \times 0.15 \times r + L^*0$$

Figure 19:
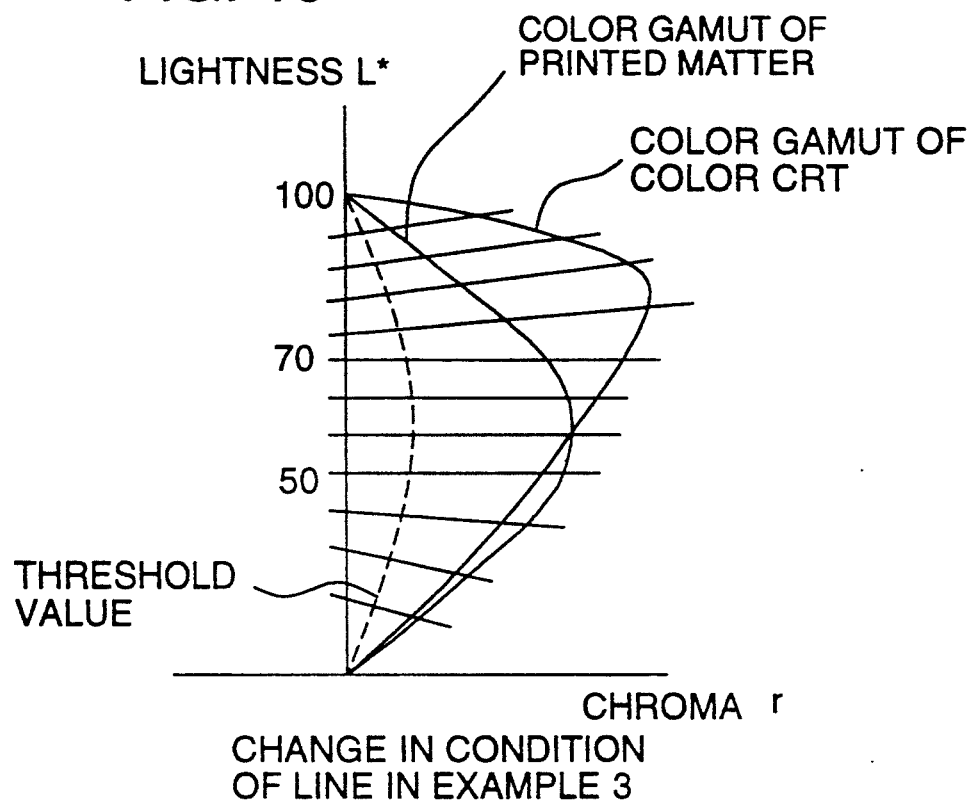

FIG. 19 shows status changes of the straight line which is determined as described above.

Next, assuming that, on the straight line obtained on the target value T″, the maximum staturation of the printed matter color gamut (input side) is r INmaxT″ and the maximum chroma of the CRT color gamut (output side) is r TVmaxT″, when r INmaxT″ is not larger than r TVmaxT″, r AmaxT″=r INmaxT″, and when r INmaxT″ is larger than r TVmaxT″, R AmaxT″=r TVmaxT″.

As shown in FIG. 16, the chroma value r AmidT″ which is "a" times (a<1.0), for example, about ⅓ times of the maximum chroma value r AmaxT″ is assumed as a threshold value.

When rT″ is not larger than r AmidT″, no correction is performed, and it is assumed that L* T″2=L* T″, u* T41 2=u* T″, v* T″2=v* T″, rT″2=rT″, and θT″2=θT″.

When rT″ is larger than r AmidT″, it is assumed that L*T″2=L*T″, θT″2=θT″ and rT″2 is obtained as follows:

$$rT''2 = \frac{(r\,TVmaxT'' - r\,AmidT'')}{(r\,AmaxT'' - r\,AmidT'')} \times$$

$$(rT'' - r\,AmidT'') + r\,AmidT''$$

It is assumed that the hue angle is fixed and θT″2=θT″. u* T″2 and v* T″2 are values when θT″2=θT″ and rT″2 satisfies the above expression.

Furthermore, since the variation of lightness when the chroma value moves from rT″ to rT″2 on the straight line is b (rT″−rT″2), it is assumed that:

$$L^*T''2 = L^*T'' - b(rT'''rT''2)$$

In this case, when L* T"<50, b<0 and the lightness decreases. When 50≦L* T"≦70, b=0 and the lightness does not change. When L* T">70, b>0 and the lightness increases.

L* T', u* T', and v* T' are obtained by the above method and these chroma is increased within the color reproduction gamut of the color CRT.

Example 4

Assuming that, at L*T" and θT", the maximum chroma value of the printed matter color gamut (input side) is r INmaxT" and the maximum chroma value of the color CRT device color gamut (output side) is r TVmaxT", when r INmaxT" is not larger than r TvmaxT", r AmaxT"=r INmaxT", and when r ImaxT" is larger than r TvmaxT", r AmaxT"=r TvmaxT".

The chroma value r AmidT" which is "a" (a<1.0) times, for example, about ⅔ times, of r AmaxT" is used as a threshold value (see FIG. 14).

When rT" is not larger than r AmidT", no correction is performed, and it is assumed that L* T"2=L* T", u* T"2=u* T", v* T"2=v* T", rT"2=rT", and θT"2=θT".

When rT" is larger than r AmidT", rT"2 is set as shown below depending on θT".

Figure 20:
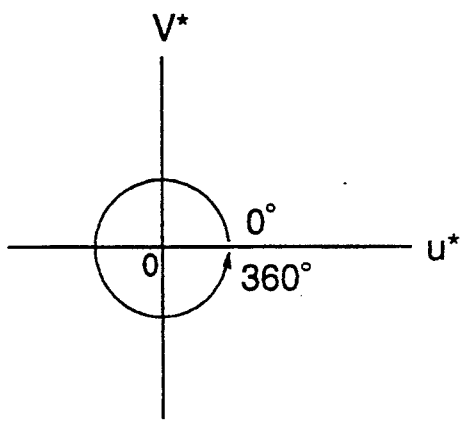
FIG. 20 shows the angle on the L*u*v* colorimetric system.

If the expression "120°≦θT"≦170" is not held when the hue angle θ is set as follows (see FIG. 20):

θ=0°: Positive on the u* axis

θ=90°: Positive on the v* axis

θ=180°: Negative on the u* axis

θ=270°: Negative on the v* axis

θ=360°: Positive on the u* axis it is required that L* T"2=L* T" and θT"2=θT" and rT"2 is expressed as follows:

$$rT"2 = \frac{(r\,TVmaxT" - r\,AmidT")}{(r\,AmaxT" - r\,AmidT")} \times$$

$$(rT" - r\,AmidT") + r\,AmidT"$$

u* T"2 and v* T"2 are values when θT"2=θT" and rT"2 satisfies the above expression.

Next, when the expression "120°θT"≦170°" is held, θT" is converted to θT"2 by the following expression. 131° is a hue angle at the maximum chroma point of green of the color gamut of color CRT (see FIGS. 11a–11c), and 147° is a hue angle at the maximum chroma point of green of the color gamut of the printed matter (see FIGS. 3a–3c).

When 120°≦θT"≦147°:

$$\theta T"2 = (147° - 131°)\frac{(r\,TVmaxT" - r\,AmidT")}{(r\,AmaxT" - r\,AmidT")} \times$$

$$(rT" - r\,AmidT") + \frac{(\theta T" - 120°)}{(147° - 120°)} + \theta T'$$

When 147°≦θT"≦170°:

$$\theta T"2 = (147° - 131°)\frac{(r\,TVmaxT" - r\,AmidT")}{(r\,AmaxT" - r\,AmidT")} \times$$

$$(rT" - r\,INmidT") + \frac{(170° - \theta T")}{(170° - 147°)} + \theta T"$$

Then, it is required that L* T'=L* T" and rT" is expressed as follows:

$$rT"2 = \frac{(r\,TVmaxT"\,2 - r\,AmidT"\,2)}{(r\,AmaxT"\,2 - r\,AmidT"\,2)} \times$$

$$(rT" - r\,AmidT"\,2) + r\,AmidT"\,2$$

In this expression, r INmaxT" 2 indicates the maximum chroma value of the color gamut of the printed matter (input side) for L* T"2 and θT"2, and r TVmaxT" 2 indicates the maximum chroma value of the color gamut of color CRT (output side) for L* T"2 and θT"2.

When r INmaxT" 2 is not larger than r TVmaxT" 2, r AmaxT" 2=r INmaxT" 2, and when r INmaxT" 2 is larger than rTVmaxT" 2, r AmaxT" 2=r TVmaxT" 2. The chroma value which is "a" (a<1.0) times, for example, ⅔ times of r AmaxT"2 is used as r AmidT" 2.

u*T"2 and v*T"2 are values to obtain θT"2 and rT"2 above described.

L* T"2, u* T"2, and v* T"2 are obtained by the above method, and these chroma is increased within the color reproduction gamut of the color CRT.

Example 5

Assuming that, at L*T" and θT", the maximum chroma value of the printed matter color gamut (input side) is r INmaxT" and the maximum chroma value of the color CRT device color gamut (output side) is r TVmaxT", when r INmaxT" is not larger than r TVmaxT", r AmaxT"=r INmaxT", and when r ImaxT" is larger than r TVmaxT", r AmaxT"=r TVmaxT".

The chroma value r AmidT" which is "a" (a<1.0) times, for example, about ⅔ times, of r AmaxT" is used as a threshold value (see FIG. 14).

When rT" is not larger than r AmidT", no correction is performed, and it is assumed that L* T"2=L* T", u* T"2=u* T", v* T"2=v* T", rT"2=rT", and 0T"2=θT".

When rT" is larger than r AmidT", rT' is set as shown below depending on θT".

When the expression "200°≦θT"≦300°"" is not held, it is required that L* T"2=L* T" and θT"2=θT" and rT"2 is expressed as follows:

$$rT"2 = \frac{(r\,TVmaxT" - r\,AmidT")}{(r\,AmaxT" - r\,AmidT")} \times$$

$$(rT" - r\,AmidT") + r\,AmidT"$$

u* T"2 and v* T"2 are values when θT"2=θT" and rT"2 satisfies the above expression.

Next, when the expression "200°≦θT"≦300°"" is held, θT" is converted to θT"2 by the following expression. 266° is a hue angle at the maximum chroma point of blue of the color gamut of color CRT (see FIGS. 11a–11c), and 234° is a hue angle at the maximum chroma point of cyan of the color gamut of the printed matter (see FIGS. 3a–3c). When 200°≦θT"≦234:

$$\theta T"2 = (266° - 234°)\frac{(r\,TVmaxT" - r\,AmidT")}{(r\,AmaxT" - r\,AmidT")} \times$$

-continued $$(rT'' - rAmidT'') \times \frac{(\theta T'' - 200°)}{(234° - 200°)} + \theta T''$$

When $234° \leq \theta T'' \leq 300°$:

$$\theta T''2 = (266° - 234°)\frac{(rTVmaxT'' - rAmidT'')}{(rAmaxT'' - rAmidT'')} \times$$

$$(rT'' - rINmidT'') \times \frac{(300° - \theta T'')}{(300° - 234°)} + \theta T''$$

Therefore, it is required that L* T''2 = L* T'' and rT''2 is expressed as follows:

$$rT''2 = \frac{(rTVmaxT''\,2 - rAmidT''\,2)}{(rAmaxT''\,2 - rAmidT''\,2)} \times$$

$$(rT'' - rAmidT''\,2) + rAmidT''\,2$$

In this expression, r INmaxT'' 2 indicates the maximum chroma value of the color gamut of the printed matter (input side) for L* T''2 and $\theta T''$2, and r TVmaxT''2 indicates the maximum chroma value of the color gamut of color CRR (output side) for L* T''2 and $\theta T''$2.

When r INmaxT'' 2 is not larger than r TVmaxT'' 2, r AmaxT'' 2 = r INmaxT'' 2, and when r INmaxT'' 2 is larger than rTVmaxT'' 2, r AmaxT'' 2 = r TVmaxT'' 2. The chroma value which is "a" (a<1.0) times, for example, ⅔ times of r AmaxT'' 2 is used as r AmidT'' 2.

u*T''2 and v*T''2 are values to obtain $\theta T''$2 and rT''2 above discribed.

L* T''2, u* T''2, and v* T''2 (target value T''2) are obtained by the above method and these chroma is increased within the color reproduction gamut of the color CRT.

In [Examples 1] to [Examples 5], the chroma is fully increased up to the color reproduction gamut of the color CRT. However, the increases may be adjusted in accordance with a desire without increasing up to the maximum value.

Next, the values L* T''2, u* T''2, and v* T''2, which are obtained for each combination of Y', M', and C', are given to the color CRT color gamut (shown in FIGS. 11a–11c) as a target value T''2, and the values of R, G, and B are obtained by the convergence operation. Since the convergence operation is the same as the one described in FIGS. 5 to 9, the description is omitted.

By doing this, combinations of R, G, and B for reproducing reproduced colors by each combination of Y', M', and C', for example, to reproduce on color CRT are obtained.

A color masking device, which is constructed so that the color correction data (R, G, and B) obtained for the combination of image data of Y', M' and C' as described above processes (5) to (12) is stored in a lookup table (LUT) (220 in FIG. 1) beforehand and the color correction data is referred to by input image data (Y', M', C'), will be described.

In this case, when R, G, and B image data corresponding to all Y', M', and C' image data is to be stored in the lookup table, a large capacity is required for the lookup table. The applicant proposes a method that to reduce the memory capacity, a color space formed by Y', M', and C' image data is divided into a plurality of basic lattices, R, G, and B image data for a combination of Y', M', and C' image data positioned at the apexes thereof are stored in the lookup table, and when R, G, and B image data for a combination of Y', M', and C' image data do not exist, R, G, and B image data are obtained by weight average of the R, G, and B image data at the apexes of the basic lattices containing the Y', M', and C' image data (interpolation point).

In this sense, R, G, B image data only for the combination of Y', M', C' image data of 32×32×32=32768 are obtained and stored in L.U.T..

Figure 21:
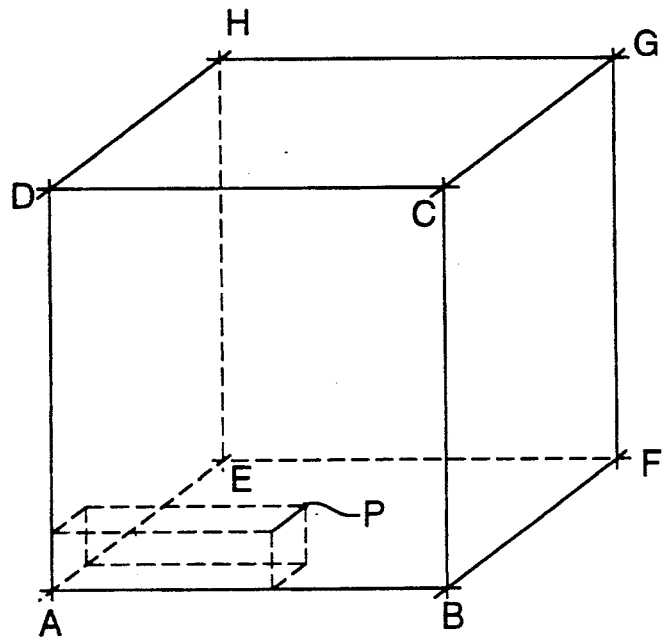
FIGS. 21 to 24 are illustrations for the interpolation processing.

As shown in FIG. 21, for example, when an interpolation point P exists in a basic lattice formed by the apexes A to H, the volume of each cuboid formed by the apexes which are diagonally positioned to the interpolation point P and point P itself is used as a weighting factor for the R, G, and B image data at the apexes A to H.

Assuming that the R, G, and B image data at the apexes A to H of the basic lattice containing the interpolation point P are Ri, Gi, and Bi (i=1 to 8) and the weighting factor for the R, G, and B image data at the apexes A to H is Ai (i=1 to 8), R, G, and B image data Rp, Gp, and Bp at the interpolation point P are calculated from the following expressions.

$$Rp = \left(1 / \sum_{i=1}^{8} Ai\right) \sum_{i=1}^{8} Ai\,Ri \tag{2}$$

$$Gp = \left(1 / \sum_{i=1}^{8} Ai\right) \sum_{i=1}^{8} Ai\,Gi$$

$$Bp = \left(1 / \sum_{i=1}^{8} Ai\right) \sum_{i=1}^{8} Ai\,Bi$$

In this interpolation process, calculation of R, G, and B image data Rp, Gp, and Bp at the interpolation point P requires 8 times of multiplication accumulation process for each data.

Figure 22:
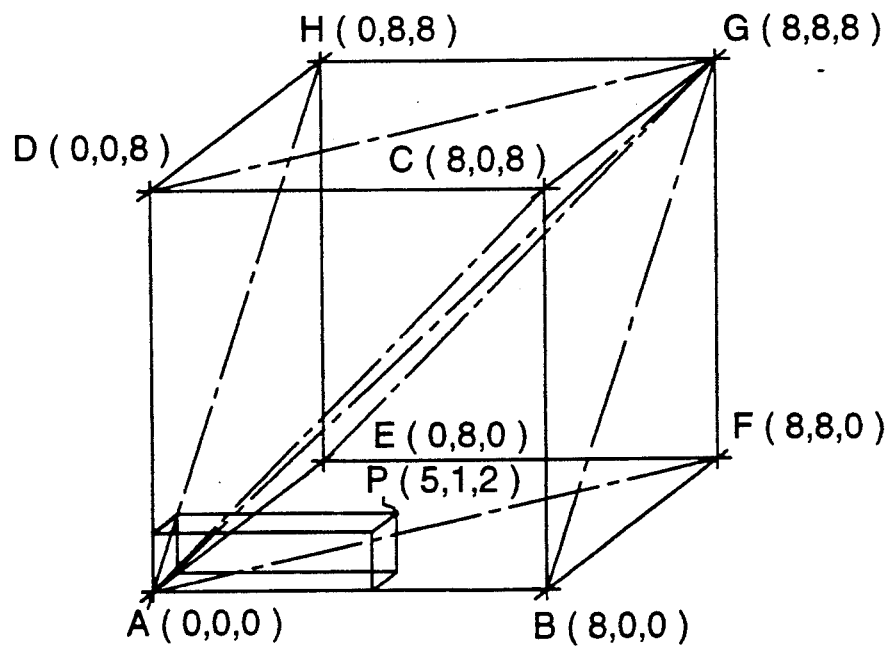
Figure 23:
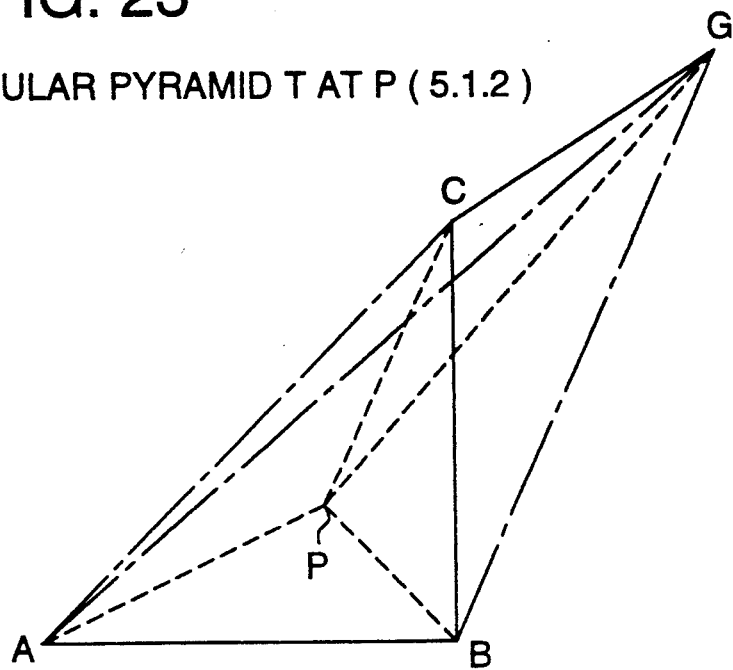

The applicant proposes interpolation process which minimizes the multiplication accumulation processing count. For a basic lattice formed by the apexes A to H, as shown in FIG. 22, six triangular pyramids enclosed by dashed lines are formed. When the coordinates of an interpolation point P are (5, 1, 2), the interpolation point P is contained in a triangular pyramid T formed by the apexes A, B, C and G as shown in FIG. 23.

When the triangular pyramid T is determined, the interpolation point P is connected to the apexes A, B, C, and G, new 4 triangular pyramids are formed, and the volumes $V_{BCGP}$, $V_{ACGP}$, $V_{ABGP}$, and $V_{ABCP}$ can be obtained. The R, G, and B image data Rp, Gp, and Bp at the interpolation point P are calculated from the volumes and the R, G, and B image data $R_A$ to $R_G$, $G_A$ to $G_G$ and $B_A$ to $B_G$ at the apexes A, B, C, and G using the following expressions:

$V_{ABCG}$ indicates the volume of the triangular pyramid T.

$$Rp = \tag{3}$$

$$1/V_{ABCG}(V_{BCGP} \cdot R_A + V_{ACGP} \cdot R_B + V_{ABGP} \cdot R_C + V_{ABCP} \cdot R_G)$$

$$Gp =$$

$$1/V_{ABCG}(V_{BCGP} \cdot G_A + V_{ACGP} \cdot G_B + V_{ABGP} \cdot G_C + V_{ABCP} \cdot G_G)$$

$$Bp =$$

-continued $$1/V_{ABCG}(V_{BCGP} \cdot B_A + V_{ACGP} \cdot B_B + V_{ABGP} \cdot B_C + V_{ABCP} \cdot B_G)$$

When the coordinates of the interpolation point P are changed, the triangular pyramid T to be used is changed.

Figure 24:
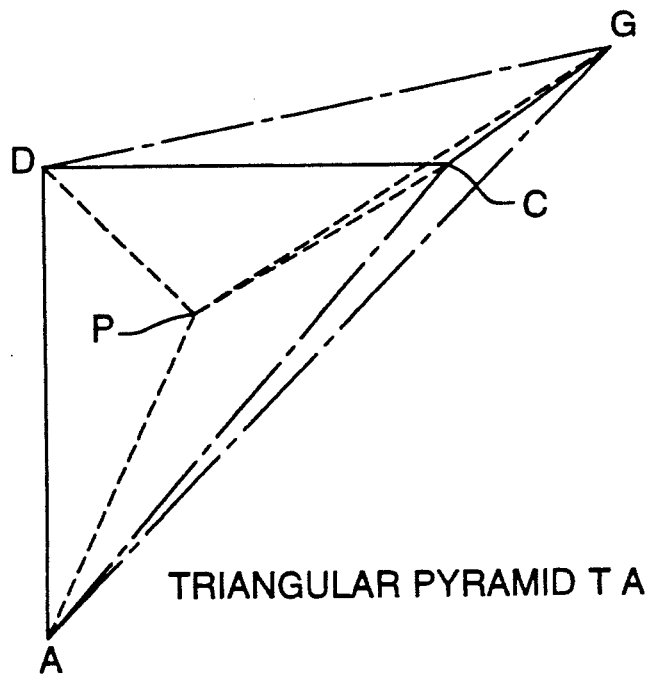

When the coordinates of the interpolation point P are P(3, 1, 5), for example, the interpolation point P is contained in a triangular pyramid T formed by the apexes A, C, D, and G as shown in FIG. 24 and this triangular pyramid is used.

In the interpolation processing using a triangular pyramid like this, the R, G, and B image data Rp, Gp, and Bp at the interpolation point P can be calculated by 4 times of multiplication accumulation processing.

Figure 25:
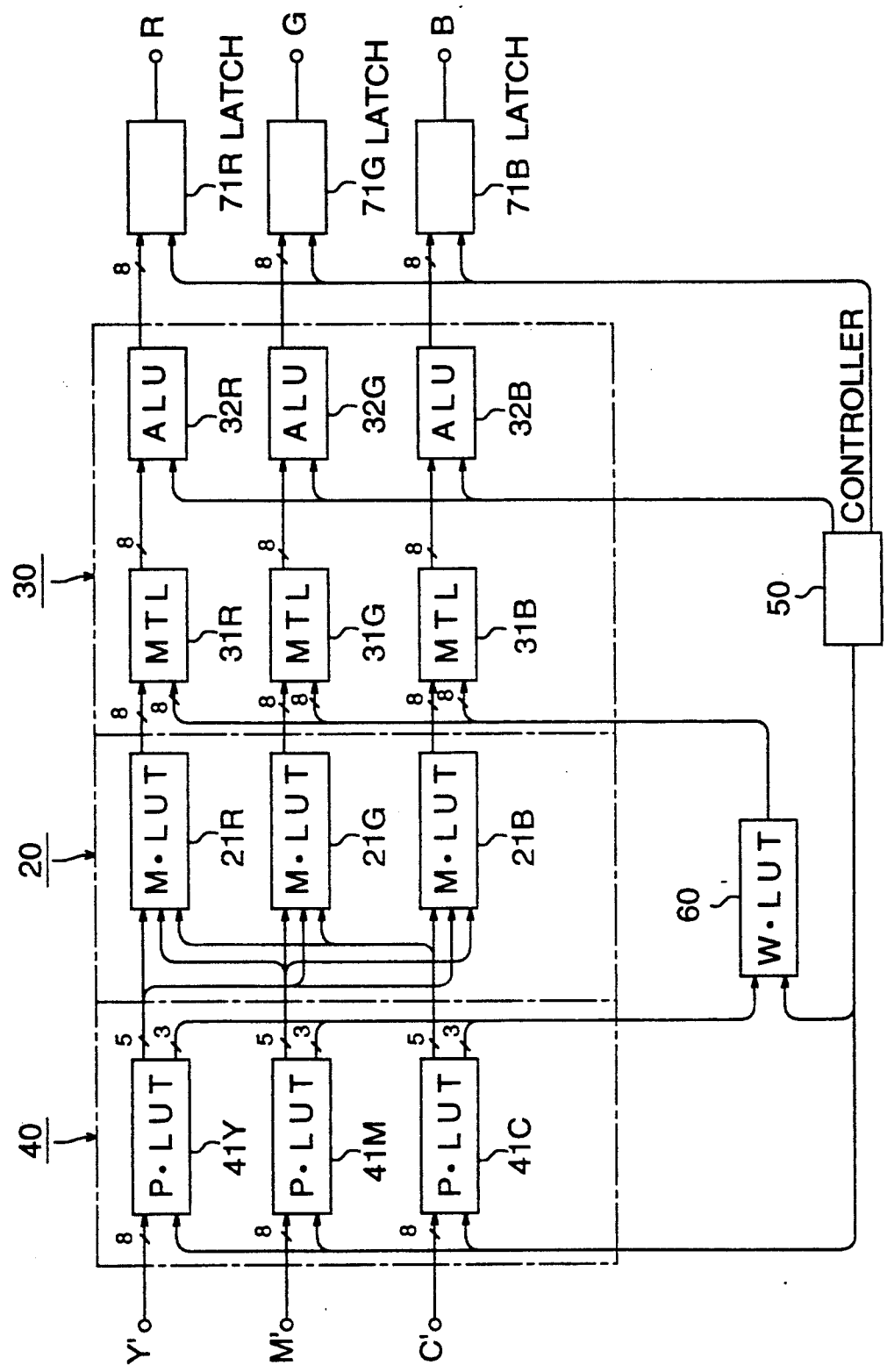
FIG. 25 is schematic views of a color masking device.
Figure 26:
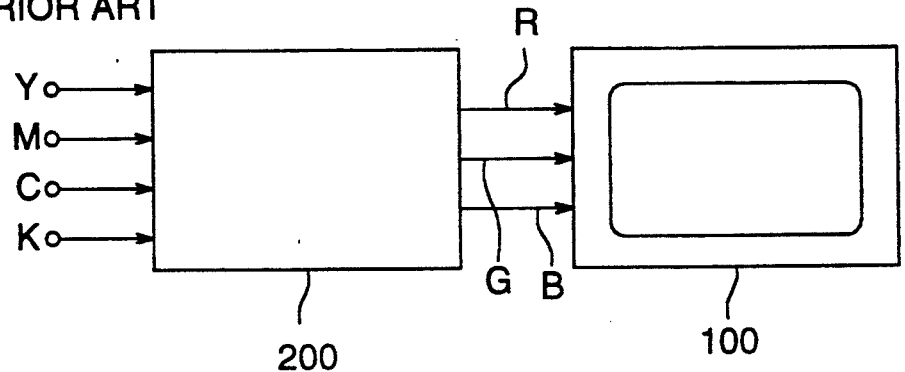
FIGS. 26 and 27 are illustrations for the conventional method.
Figure 27:
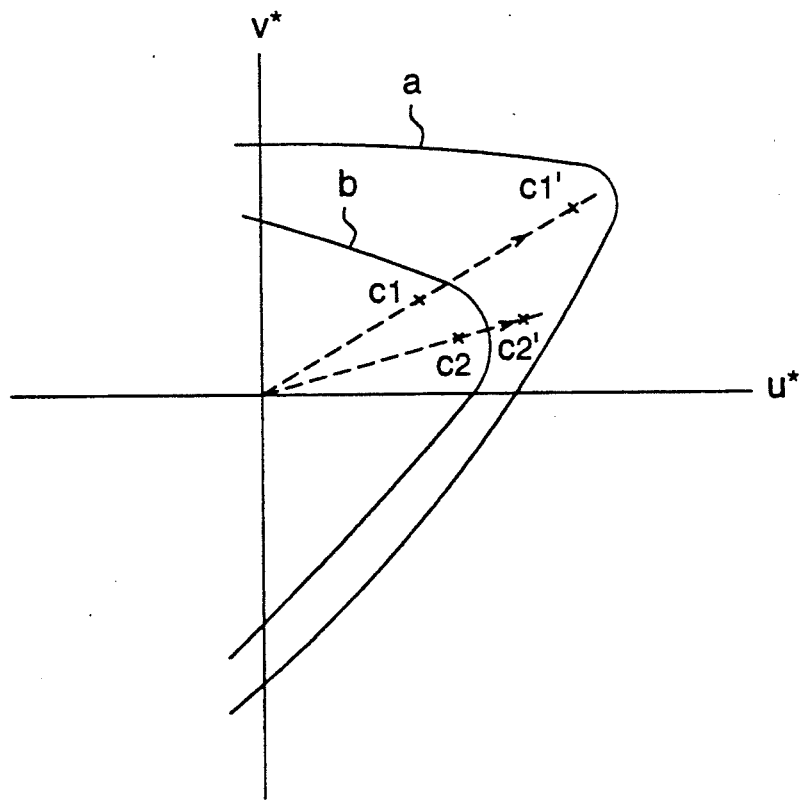

FIG. 25 shows an actual configuration example of a color masking device.

In FIG. 25, numeral 20 indicates a color correction data storage means, and lookup tables (MLUT) 21R to 21B constituting the storage means 20 store R, G, and B color correction data.

ROMs, for example, with a capacity of 256K bits are used for MLUT21R to MLUT21B, only 32 points between the minimum level and the maximum level of Y', M', and C' image data are extracted, and image data at $32 \times 32 \times 32 = 32768$ points are stored in each of MLUT21R to MLUT21B.

In this case, Y', M', and C' image data are 8 bits long and have 256 gradations. As to distribution of 32 points, 256 is evenly divided into 32 portions by 8 sequentially, for example, starting at 0 as follows:

0, 8, 16, - - -, 240, 248

The numbers from 249, which is the 33rd point, to 255 are not used or handled as 248.

The R, G, and B image data at the distribution points, that is, at the apexes of the basic lattice whose basic lattice interval is the 8-quantization level are calculated as described above processes (5) to (12), and the calculated image data are stored in MLUT21R to MLUT21B.

Numeral 60 indicates a lookup table (WLUT) constituting a weighting factor storage means. WLUT60 stores the weighting factor corresponding to each interpolation point. In the case of the interpolation processing using a cube, when the basic lattice interval is the 8-quantization level as described above, the total of 8 times of weighting factors is:

$8 \times 8 \times 8 = 512$

The number of weighting factors is normalized so that the total is 256. The maximum weighting factor is 255 so that a 8- bit general purpose IC can be used as WLUT60. When the interpolation point P is, for example, at a position which is the same as the apex A shown in FIG. 21, the weighting factors P1 to P8 are as follows:

| P1, | P2, | P3, | P4, | P5, | P6, | P7, | P8 |
|---|---|---|---|---|---|---|---|
| 255, | 0, | 0, | 0, | 0, | 0, | 0, | 1 |
| (512, | 0, | 0, | 0, | 0, | 0, | 0, | 0) |

The total of weighting factors is always 256.

In the case of the interpolation processing using a triangular pyramid, when the basic lattice interval is the 8-quantization level as described above, the total of 4 times of weighting factors is:

$8 \times 8 \times 8/6 = 512/6$

The number of weighting factors is normalized so that the total is 256.

The maximum weighting factor is 255 so that a 8-bit general purpose IC can be used as WLUT60. When the interpolation point P is, for example, at a position which is the same as the apex A shown in FIG. 22, the weighting factors $V_{BCGP}$, $V_{ACGP}$, $V_{ABGP}$, and $V_{ABCP}$ are as follows;

| $V_{BCGP}$, | $V_{ACGP}$, | $V_{ABGP}$, | $V_{ABCP}$ |
|---|---|---|---|
| 255, | 0, | 0, | 1 |
| (512/6, | 0, | 0, | 0) |

The total of weighting factors is always 256. Y', M', and C' image data are supplied to lookup tables (PLUT) 41Y to 41C constituting an address signal generation means 40, and distribution signals are supplied to PLUT41Y to PLUT41C from a controller 50.

5-bit address signals corresponding to the upper 5 bits (indicating the reference points at the apexes of the basic lattice containing the interpolation point P) of Y', M', and C' image data are outputted from PLUT41Y to PLUT41C and supplied to MLUT21R to MLUT21B.

In the case of the interpolation process using a cube, 5-bit address signals are outputted sequentially according to distribution signals so that the 8 apexes of the basic lattice containing the interpolation point P are specified sequentially by MLUT21R to MLUT21B.

In the case of the interpolation process using a triangular pyramid, 5-bit address signals are outputted sequentially according to distribution signals so that the 4 apexes of the triangular pyramid containing the interpolation point P are specified sequentially by MLUT21R to MLUT21B.

R, G, and B image data outputted from MLUT21R to MLUT21B are supplied to multipliers (MTL) 31R to 31B constituting a multiplication accumulation means 30.

Lower 3 bits (indicating the position of the interpolation point P in the basic lattice) of Y', M', and C' image data are outputted from PLUT41Y to PLUT41C as weighting factor specification signals, and the weighting factor specification signals are supplied to WLUT60. Distribution signals are supplied to WLUT60 from the controller 50, and the weighting factors are sequentially outputted according to the distribution signals.

In the case of the interpolation process using a cube, as the 8 apexes of the basic lattice containing the interpolation point P are specified sequentially by MLUT21R to MLUT21B, the 8 weighting factors P1 to P8 are sequentially outputted.

In the case of the interpolation process using a triangular pyramid, as the 4 apexes of the triangular pyramid containing the interpolation point P are specified sequentially by MLUT21R to MLUT21B, the 4 weighting factors are sequentially outputted.

Weighting factors outputted from WLUT60 are supplied to MTL31R to MTL31IB. R, G, and B image data (8 bits long) outputted from MLUT21R to MLUT21B are multiplied by weighting factors (8 bits long) from WLUT60 in MTL31R to MTL31B.

Multiplication outputs of upper 8 bits of MTL31R to MTL31B are supplied to accumulators (ALU) 32R to 32B and added by them. A reset signal is supplied to ALU32R to ALU32B from the controller 50.

In the case of the interpolation process using a cube, in correspondence with the 8 apexes of the basic lattice containing the interpolation point P, the add operation is performed sequentially. Whenever the results are latched by a latch circuit which will be described later, the accumulators are reset.

In the case of the interpolation process using a triangular pyramid, in correspondence with the 4 apexes of the triangular pyramid containing the interpolation point P, the add operation is performed sequentially. Whenever the results are latched by a latch circuit which will be described later, the accumulators are reset.

As described above, the total of 8 weighting factors in the case of the interpolation process using a cube and the total of 4 weighting factors in the case of the interpolation process using a triangular pyramid are 256. In this example, the upper 8 bits of multiplication outputs of MTL31R to MTL31B are used, that is, a so-called 8 bit shift is performed. By doing this, the processing of $$1/\sum_{i=1}^{8} Ai$$

Ai in Expression (2) and $1/V_{ABCG}$ in Expression (3) is performed.

Outputs of ALU32R to ALU32B constituting the multiplication accumulation means 30 are supplied to latch circuits 71R to 71B. A latch pulse is supplied to the latch circuits 71R to 71B from the controller 50.

In the case of the interpolation process using a cube, the results of the add operation which is performed sequentially in correspondence with the 8 apexes of the basic lattice containing the interpolation point P are latched.

In the case of the interpolation process using a triangular pyramid, the results of the add operation which is performed sequentially in correspondence with the 4 apexes of the triangular pyramid containing the interpolation point P are latched.

Therefore, in the case of the interpolation process using a cube, R, G, and B image data expressed by Expression (2), at the interpolation point P are outputted from the latch circuits 71R to 71B. In the case of the interpolation process using a triangular pyramid, R, G, and B image data expressed by Expression (3), at the interpolation point P are outputted from the latch circuits 71R to 71B.

Incidentally, in the above embodiments, basic colors of color image components of the color hardcopy is explained as four colors of Y, M, C, and K, however, the present invention is also applicable to the case of three colors of X, M, C. In this case, the data of Y, M, C are used directly as Y', M', C'. Apart used to obtain Y', M', C' from Y, M, C, K is eliminated.

In this example, as described above, as to the lightness direction, L* among the values of the colorimetric system obtained for each combination of Y', M', and C' is converted according to the ratio of the lightness range of the color gamut of printed matter (input side) on the lightness axis to that of the color gamut of the color CRT (output side), and the lightness of the color gamut of printed matter is enlarged and mapped. As to the chroma direction, no value is corrected at the overlapped center portion of the color gamut of printed matter (input) and that of the color gamut of the color CRT (output). In the peripheral area, u* and v* among the values of the colorimetric system obtained for each combination of Y', M', and C' are converted according to the chroma range of the two color gamuts and the chroma of the color gamut of printed matter is enlarged and mapped.

By doing this, the color reproduction gamut of printed matter is expanded to the color reproduction gamut of the color CRT by a natural conversion result, and the color reproduction obtained by a combination of R, G, and B provides satisfactory and natural lightness and chroma. In this example, for example, in a high or low lightness area, the slope of the straight line is positive or negative and the increase amount of chroma is suppressed when the chroma is increased and mapped, and hence excessive increase in only colors caused by enlarging and mapping, which causes color reproduction to be unnatural, can be suppressed.

When the chroma of the color gamut of printed matter is enlarged and mapped, the hue is moved in the direction from the green peak of the color gamut of printed matter to the green peak of the color gamut of the color CRT or from the cyan peak of the color gamut of printed matter to the blue peak of the color gamut of the color CRT, and hence the chroma is balanced as a whole.

In Example 5 of Item (12) of the above embodiment, the hue is moved in the direction from the cyan peak of the color gamut of printed matter to the blue peak of the color gamut of the color CRT. The hue may be moved to the green peak in the reverse direction.

In Example 4 or Example 5 of Item (12) of the above embodiment, the hue scope where the hue is moved is limited to one area. A plurality of areas may be used, and Example 4 and Example 5 may be used simultaneously.

In the above embodiment, the lightness is kept constant when the chroma is moved. The lightness may be changed as the chroma moves.

The present invention is also applicable to L*a*b* colorimetric system as well as L*u*v* colorimetric system.

According to the present invention, as described above, as to the lightness direction, L* among the values of the colorimetric system obtained for each combination of the input color component image information is converted according to the ratio of the lightness range of the input side color gamut on the lightness axis to that of the output side color gamut, and the lightness of the input side color gamut is enlarged and mapped. As to the chroma direction, no value is corrected at the overlapped center portion of the color reproduction gamut of the input side and that of the output side. In the peripheral area, u* and v* or a* and b* among the values of the colorimetric system obtained for each combination of the input color component image information are converted according to the chroma ranges of the two color gamuts and the chroma of the input side color gamut is enlarged and mapped.

Therefore, the color reproduction gamut of the input side color gamut is expanded in the color reproduction gamut of the output side by a natural conversion result, and the color reproduction obtained by the output color component image information becomes natural.

When u* and v* or a* and b* are converted, and the chroma is enlarged and mapped, since, for example, in a high lightness area, the chroma is enlarged so as to increase lightness in accordance with the increases of the chroma, the increase amount of chroma is suppressed. Therefore, excessive increase in only colors, which causes color reproduction to be unnatural can be suppressed.

When the chroma of the input side color gamut is enlarged and mapped, the hue is moved so that the peak of each color of the input side color gamut moves toward the peak of the corresponding color of the output side color gamut. Therefore, the color reproduction gamut on the input side is expanded to the color reproduction gamut on the output side by natural conversion with the entire chroma balance kept, the color reproduction obtained by the output color component image information provides satisfactory lightness and chroma, and the chroma is well balanced as a whole.

Next, an embodiment for accomplishing the second object will be described.

In this embodiment, the high lightness area of the color gamut of color CRT is moved so that the maximum lightness point of the color gamut of color CRT which comprises the values of L* TV, u* TV, and v* TV obtained in (5) among the steps (1) to (12) described above is moved to the point of u*=0 and v* =0.

So as to display clear white on the color CRT, the color temperature of white is set to 8000K to 20000K, and about 8500K is used for high definition TV which is used in this embodiment.

The maximum lightness value of the color gamut of CRT is a value of white. Since the selected standard illuminant condition is 6500K, the white of 8500K is off the point of u*=0 and v*=0. The u* and v* values at the maximum lightness point in this example are u*=−20.2 and v*=−44.8.

Such a shift of white causes problems when printings images are reproduced as CRTs as described above.

Figure 28:
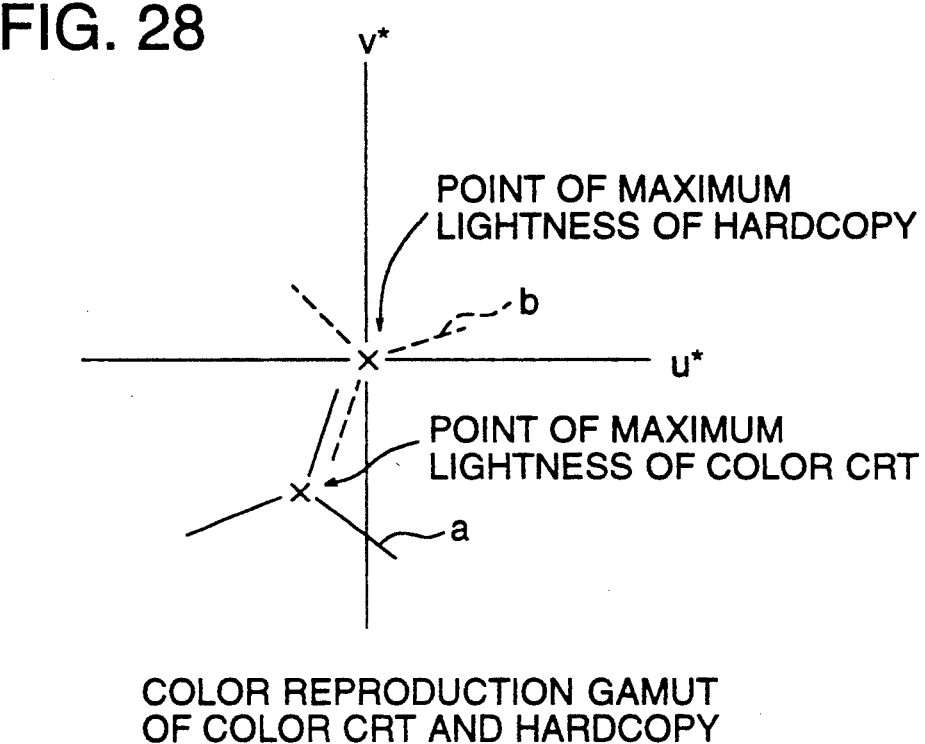
FIGS. 28 and 29 are illustrations to compare the white of the maximum lightness of color CRT with that of printed matter.
Figure 29:
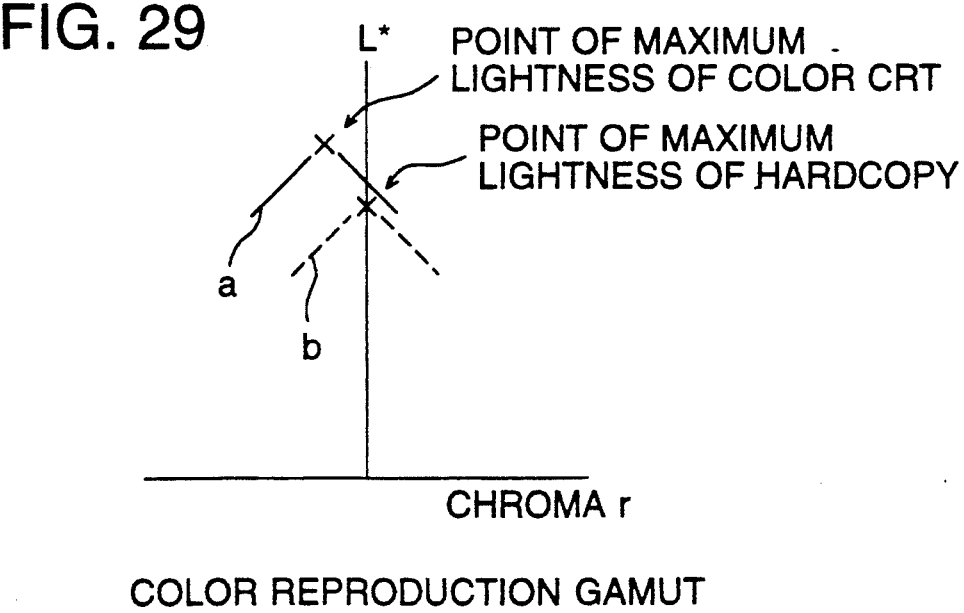

White of the maximum lightness value of printed matter is at the reference point of u*=0 and v*=0. When the white of the maximum lightness value of this printed matter is simply reproduced at the maximum point of u*=0 and v*=0 on the L* axis of the color gamut of color CRT, the white of the maximum lightness of the printed image does not correspond to the white of the maximum lightness of color CRT, and the lightness of white becomes low (see FIGS. 28 and 29). Therefore, the contrast of reproduced color CRT images becomes low.

To solve this problem, it is desirable to move the high lightness area near the white area of the color gamut of printed matter so that the maximum lightness point moves from u*=0 and v*=0 to u*=−20.2 and v*=−44.8 and allow the maximum lightness of printed matter to correspond to the maximum lightness of color CRT.

In this example, the high lightness area near the white area of the color gamut of color CRT is moved so that the maximum lightness point moves from u*=−20.2 and v*=−44.8 to u*=0 and v*=0 in stead of moving the color gamut of printed matter, and as a result, the maximum lightness of printed matter corresponds to the maximum lightness of color CRT.

For the movement of the color gamut of color CRT, the values of L* TV, u* TV, and v* TV obtained by the process in (5) are converted to L* TV2, u* TV2, and v* TV2 as specified below.

When L* TV<70

L* Tv2=L* TV u* Tv2=u* TV v* TV2=v* TV

When

L* TV≧70

L* TV2=L* TV u* TV2=(L* TV−70)/30×20.2+u* TV v* TV2=(L* TV−70)/30×44.8+v* TV

In this example, the shift amount in the scope of L* TV ≧70 is proportional to (L* TV−70). However, the threshold value may not be 70 and the shift amount may change nonlinearly to the value which exceeds the threshold value.

In this embodiment, TV2 which is obtained above is also used in place of TV at Steps (6) to (12) described above, and by doing this, the second objected is accomplished In this example, as described above, the high lightness area of color CRT is moved so that the maximum lightness point moves from u*=−20.2 and v*=−44.8 to u*=0 and v*=0 and the maximum lightness point of printed matter corresponds to the maximum lightness point of CRT.

As a result, when printed images (hard copy color images) are reproduced on the color CRT, white of printed images can be reproduced as white of the maximum lightness which can be displayed on the color CRT.

Therefore, the contrast of reproduced images will not decrease.

In the above embodiment, the values of u* and v* are changed so that the maximum lightness point of printed matter matches the maximum lightness point of color CRT. However, by making the the values of u* and v* of printed matter nearly equal to the values of u* and v* of color CRT though the maximum lightness point of printed matter does not match the maximum lightness point of color CRT exactly, the contrast value increases as specified by the present invention.

EFFECTS OF THE INVENTION

According to the present invention, as described above, the maximum lightness point of the input side color gamut moves so as to practically approach the maximum lightness point of the output side color gamut, and a combination of output color component image information is obtained in correspondence with the moved colorimetric system values. Therefore, in the case of color reproduction by output color component image information, the maximum lightness area in the input color reproduction scope can be reproduced by the maximum lightness point area in the output color reproduction scope. Therefore, for example, when hard copy color images are reproduced on the color CRT, the contrast of reproduced images will not be decreased even if the white of the maximum lightness of color CRT is bluish.

What is claimed is:

1. A method for expanding color image data of a first media to be reproduced on a second media having a color reproducing capability larger than that of the first media, said method comprising:

obtaining a first color gamut on a colorimetric system on the basis of a plurality of color image data of the first media the colorimetric system being one of the CIE standard L*u*v* and L*a*b* color systems;

obtaining a second color gamut on the colorimetric system on the basis of a plurality of color image data of the second media;

calculating a first lightness difference between maximum and minimum values of the lightness on a lightness axis of the first color gamut, a second lightness difference between maximum and minimum values of lightness on a lightness axis of the second color gamut, and a lightness difference ratio of the first light difference to the second lightness difference;

inputting color image data "T" of the first media;

converting the L* value of the color image "T" of the first media on the basis of the lightness difference ratio;

selecting a line passing a lightness "LT" and chroma "rT" of the color image data "T" while keeping a hue "θT" of the color image data "T";

obtaining a maximum chroma "r1max" on the selected line in the first color gamut and a maximum chroma "r2max" on the selected line in the second color gamut;

comparing the chroma "rT" of the color image data "T" with a threshold value which is "a" (a<1.0) times of the maximum chroma "r1max" of the first color gamut; and in the case that the chroma "rT" is not larger than the threshold value,
using the u* and v* values or a* and b* values of the color image data "T" without any change, or in the case that the chroma "rT" is larger than the threshold value,
calculating a first chroma difference between the maximum chroma "r1max" int he first color gamut and the threshold value, a second chroma difference between the maximum chroma "r2max" in the second color gamut and the threshold value, and the chroma difference ratio between the first chroma difference and the second chroma difference,
converting the chroma "rT" on the basis of the chroma deference ratio,
converting the u* and v* values or the a* and b* values of the color image data "T" so as to obtain a converted chroma without changing the hue "θT", and
converting further the L* value of the color image data "T" in accordance with the conversion amount of the chroma so as to increase the lightness in accordance with the increases of the chroma at least in a high lightness region.

2. The method of claim 1, when u* and v* or a* and b* at the maximum lightness point of the first color gamut are different from u* and v* or a* and b* at the maximum lightness point of the second color gamut, further comprising moving u* and v* or a* and b* of the color image data "T" of the first media, at least in the high region, in accordance with the movement distance from the maximum lightness point of first color gamut to that of the second color gamut.

3. A method for expanding color image data of a first media to be reproduced on a second media having a color reproducing capability larger than that of the first media, said method comprising:

obtaining a first color gamut on a colorimetric system on the basis of a plurality of color image data of the first media, the colorimetric system being one of the CIE standard L*u*v* and L*a*b* color systems;

obtaining a second color gamut on the colorimetric system on the basis of a plurality of color image data of the second media;

calculating a first lightness difference between maximum and minimum values of the lightness on a lightness axis of the first color gamut, a second lightness difference between maximum and minimum values of lightness on a lightness axis of the second color gamut, and a lightness difference ratio of the first and the second lightness differences; the first media on the basis of the lightness difference ratio;

comparing a chroma "rT" of the color image data "T" of the first media with a threshold value which is "a" (a<1.0) times the maximum chroma "r1max" of the first color gamut at a lightness "LT" and a hue "θT" of the color image data "T"; and in the case that the chroma "rT" is not larger than the threshold value,
using the u* and v* values or a* and b* values of the color image data "T" without any change, or in the case that the chroma "rT" is larger than the threshold value,
assuming a first region enclosed between an inner gamut surface comprising a value which is "a"-(a<1.0) times the maximum chroma of each of hue and lightness of the first color gamut and the outer surface of the first color gamut including the maximum chroma of each of the hue and the lightness of the first color gamut, and a second region enclosed between said inner gamut surface and the outer surface of the second color gamut which comprises the maximum chroma value of each of hue and lightness of the second color gamut, and
converting the u* and v* values or the a* and b* values of the color image data "T" so as to make the first region in continuous adoption with the second region.

4. The method of claim 3, wherein when the chroma "rT" increases and the hue "θT" locates within one of predetermined regions, each neighboring hue having the maximum chroma of each of blue, green, red, yellow, magenta and cyan int he first color gamut, the hue "θT" is moved in a direction toward a hue having the maximum chroma of the same color of the second color gamut.

5. The method of claim 3, wherein when the chroma "rT" increases and the hue "θT" locates within one of predetermined regions, each neighboring hue having the maximum chroma of each of three primary colors of the first color gamut, the hue "θT" is moved in a direction toward one of two hues, which are a short distance from the hue having the maximum chroma of the three primary colors of the second color gamut.

6. The method of claim 3, when u* and v* or a* and b* at the maximum lightness point of the first color gamut are different from u* and v* or a* and b* at the maximum lightness point of the second color gamut, further comprising moving u* and v* or a* and b* of a color image data of the first media, at least in a high lightness region, in accordance with the movement distance from the maximum lightness point of the first color gamut to that of the second color gamut.

* * * * *

UNITED STATES PATENT AND TRADEMARK OFFICE
CERTIFICATE OF CORRECTION

PATENT NO. : 5,317,426
DATED : May 31, 1994
INVENTOR(S) : Toru HOSHINO

It is certified that error appears in the above-indentified patent and that said Letters Patent is hereby corrected as shown below:

On the Title Page : right column, penultimate line of the Abstract change "enlarge" to --enlarged--.

Claim 1, column 27, line 7, after "media" insert a comma --,--.

Claim 1, column 27, line 42, change "int he" to --in the--.

Claim 2, column 27, line 61, change "when" to --wherein--.

Claim 4, column 28, line 55, change "int he" to --in the--.

Signed and Sealed this

Eleventh Day of April, 1995

Attest:

BRUCE LEHMAN

*Attesting Officer*   *Commissioner of Patents and Trademarks*